United States Patent [19]
Prezioso

[11] Patent Number: 5,577,169
[45] Date of Patent: Nov. 19, 1996

[54] FUZZY LOGIC ENTITY BEHAVIOR PROFILER

[75] Inventor: Robert T. Prezioso, Long Valley, N.J.

[73] Assignee: International Business Machines Corporation, Armonk, N.Y.

[21] Appl. No.: 236,731

[22] Filed: Apr. 29, 1994

[51] Int. Cl.$^6$ .................................................... G06F 17/00
[52] U.S. Cl. ............................................................ 395/61
[58] Field of Search ............................. 395/61; 364/401, 364/406, 413.01

[56] References Cited

U.S. PATENT DOCUMENTS

| | | | |
|---|---|---|---|
| 5,121,466 | 6/1992 | Zhang | 395/3 |
| 5,167,005 | 11/1992 | Yamakawa | 395/3 |
| 5,175,801 | 12/1992 | Iokibe | 395/61 |
| 5,179,625 | 1/1993 | Hisano | 395/3 |
| 5,185,849 | 2/1993 | Miyazawa et al. | 395/3 |
| 5,193,144 | 3/1993 | Tsutsumi et al. | 395/76 |
| 5,253,164 | 11/1993 | Holloway et al. | 364/406 |
| 5,375,244 | 12/1994 | McNair | 395/725 |
| 5,420,910 | 5/1995 | Rudokas et al. | 379/59 |

FOREIGN PATENT DOCUMENTS 4051326  2/1992  Japan.
4147399  5/1992  Japan.

OTHER PUBLICATIONS

Japanese Journal of Fuzzy Theory and Systems, vol. 5, No. 4, 1993, "Prediction of the Driving Environment Using the Inverse Problem of Fuzzy Relational Equations with Interval Values", H. Takahashi, S. R. Han and T. Sekiguchi.

*Primary Examiner*—Robert W. Downs
*Assistant Examiner*—A. Katbab
*Attorney, Agent, or Firm*—Louis J. Percello

[57] ABSTRACT

The behavior of entities with common characteristics is profiled using fuzzy logic. First, behavior characteristics, or indicators of a target behavior, are determined. Norms and fuzzy sets are established for each behavior characteristic and then fuzzy logic is used to develop a series of scores. A behavior profile is developed from a collection of scores, and is organized either linearly or in a hierarchy, that can be used to compare the degree to which an entity within a peer group is, or is not, associated with a set of behavior characteristics relative to others in the same peer group. The number and organization of the behavior characteristics in the profile is expandable and the importance of characteristics can be weighted.

32 Claims, 15 Drawing Sheets

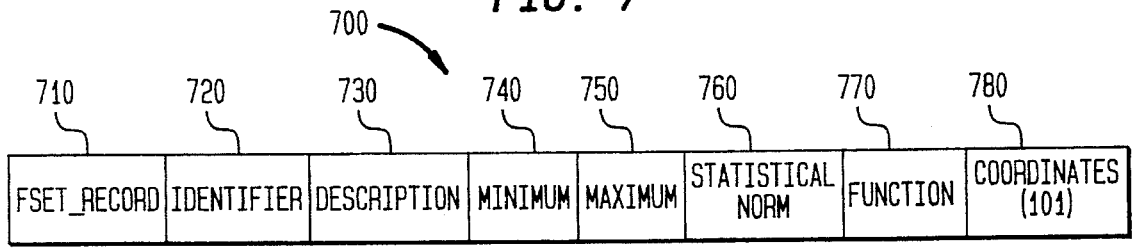
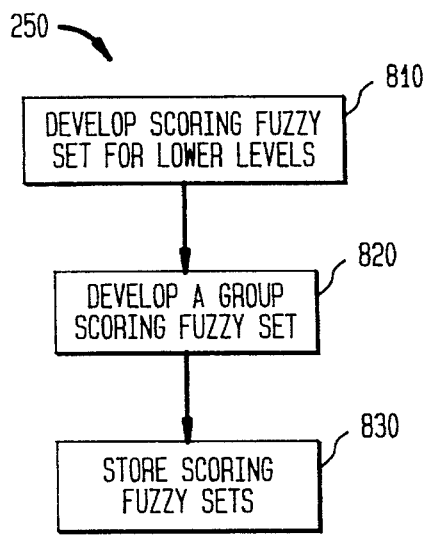
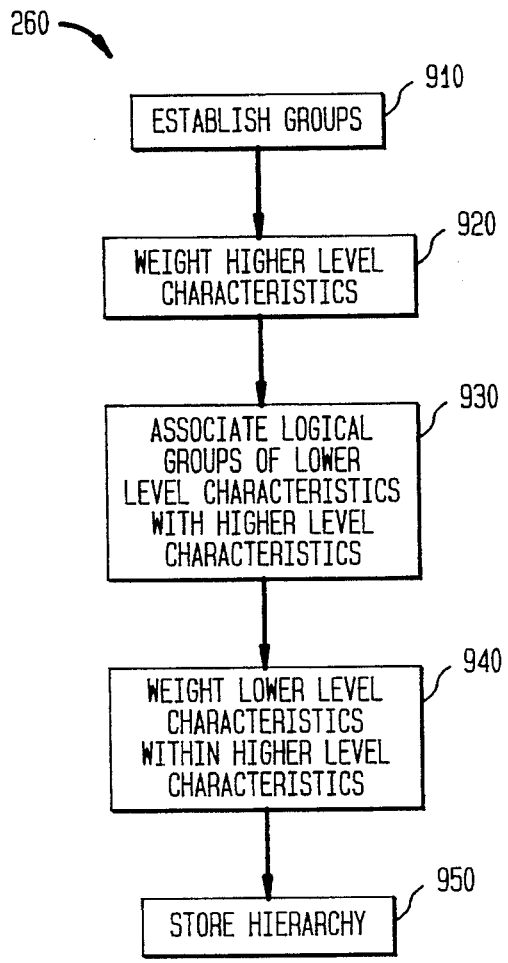

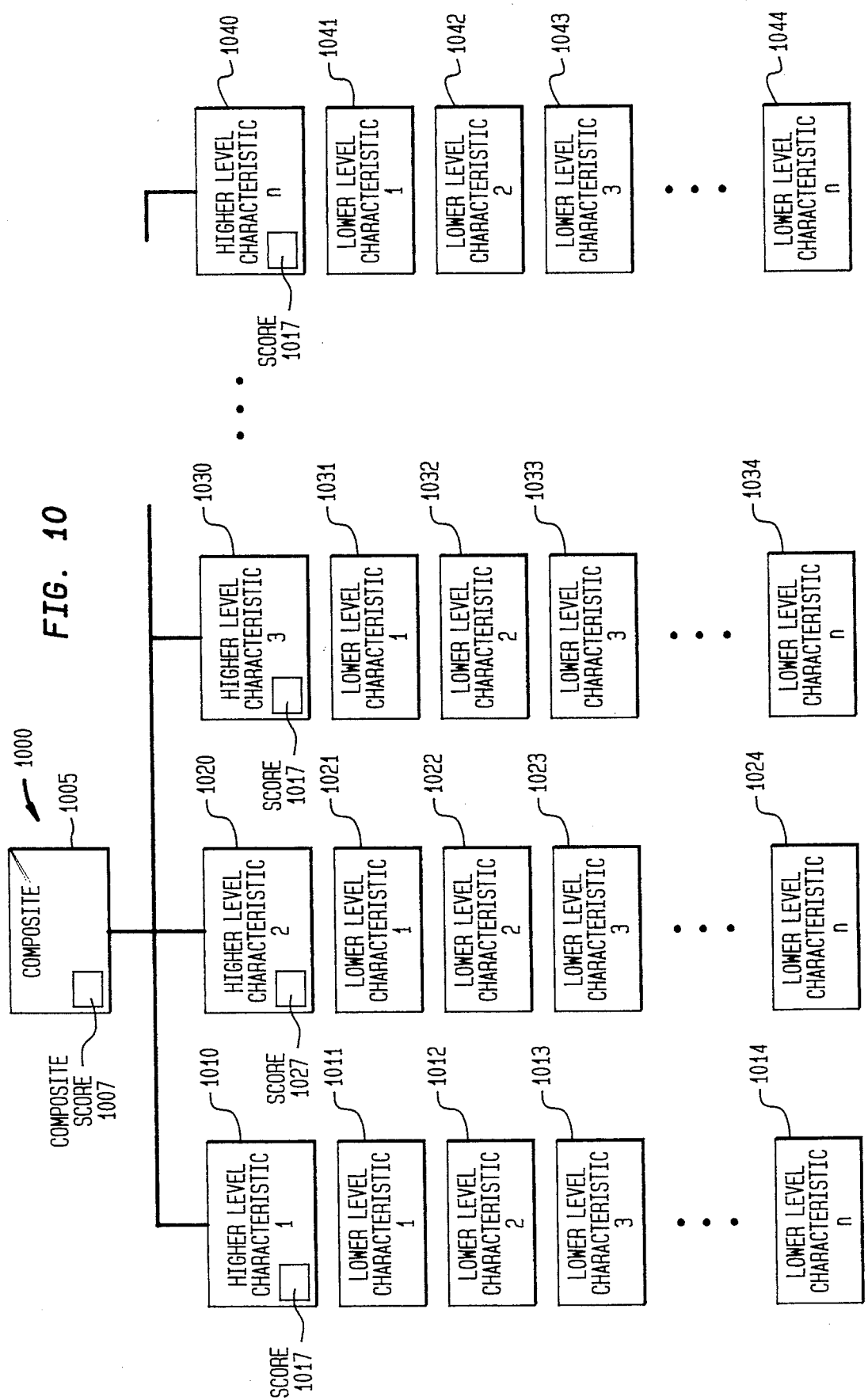

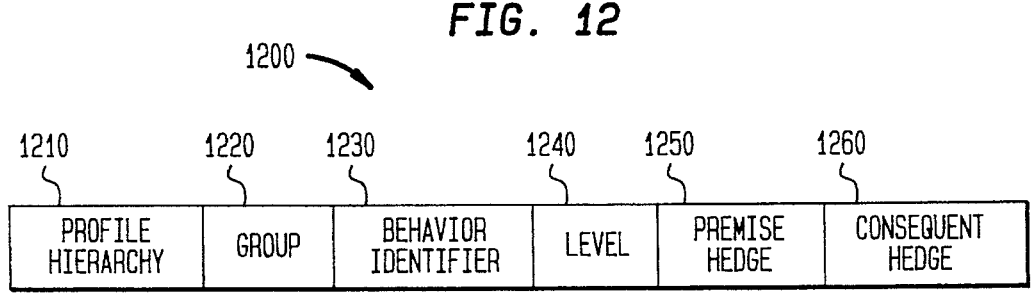
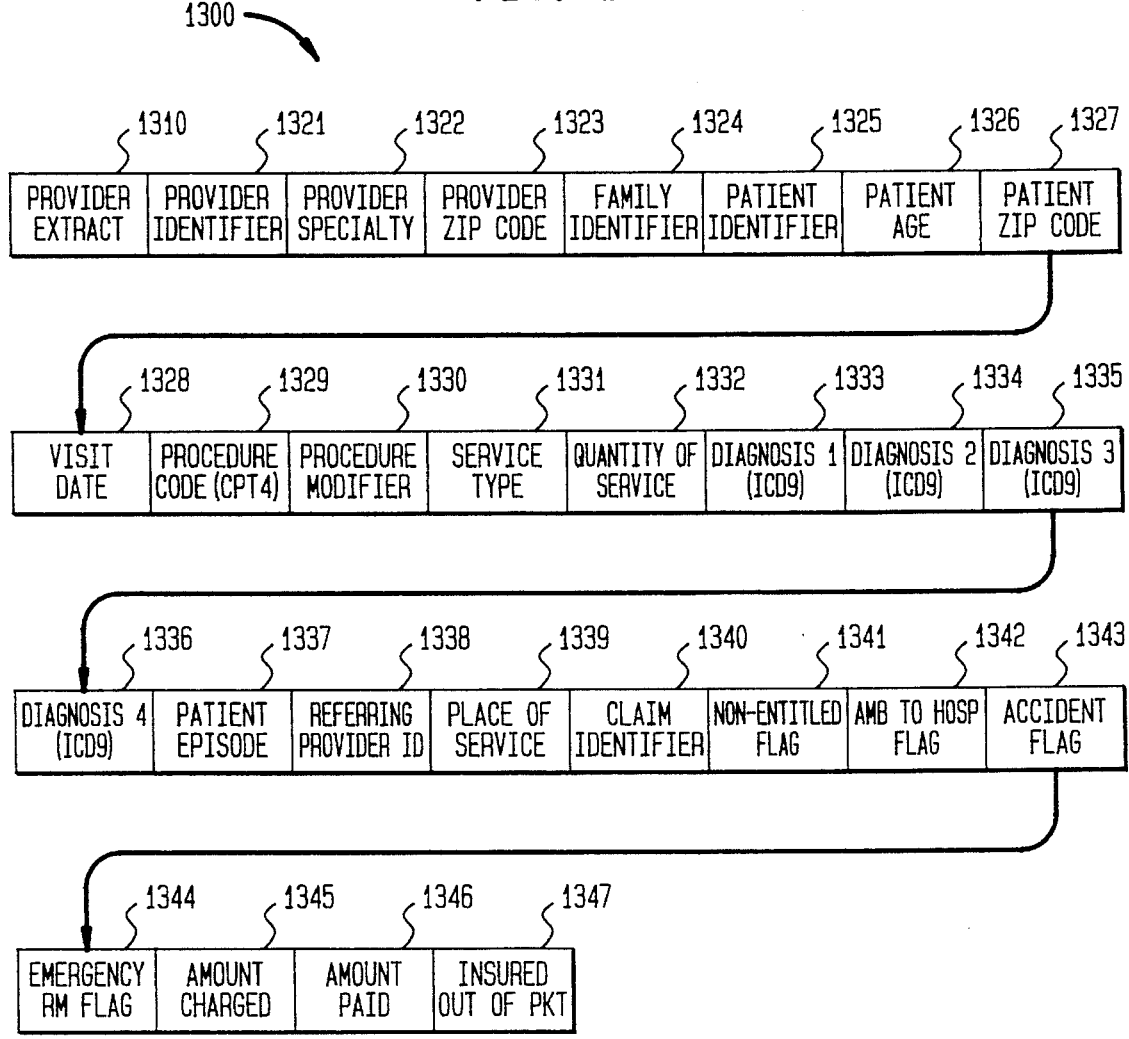

BEHAVIOR CHARACTERISTIC
FUZZY SET

BEHAVIOR CHARACTERISTIC
FUZZY SET

HIGHER LEVEL CHARACTERISTIC
SCORE FUZZY SET

| BEHAVIOR CHARACTERISTIC 2510 | BC_ENTITY ID 2520 | BC_ID 2530 | BC_VALUE 2540 |
|---|---|---|---|

FUZZY LOGIC ENTITY BEHAVIOR PROFILER

FIELD OF THE INVENTION

This invention relates to a system and method for determining behavior profiles of entities that have quantifiable behavior characteristics. More specifically, the invention relates to using fuzzy logic to determine behavior profiles of entities that have a large number of behavior characteristics.

BACKGROUND OF THE INVENTION

Since their inception, many computer systems, particularly business systems, have been used primarily to capture, store and report on data associated with individual transactions of some type, such as health care claims, bank deposits, or purchase orders. These systems have been very successful in automating manual procedures, but have created a huge volume of stored data that is not being adequately utilized to make qualitative decisions (e.g. business decisions).

In recent years it has become widely recognized in many industries that a compelling need exists to better leverage the investments made in the vast accumulation of data. The trend in this regard is to drift from the prevailing microscopic examination of data, transaction by transaction, in favor of a higher level, retrospective evaluation of data.

This need has spawned a generation of so-called decision support and expert systems designed to assist the human decision making process. In some cases these systems use a rudimentary method of encoding human knowledge to process data and, in other cases, the informational value of data is increased through the use of various data navigation tools and techniques.

While these systems have achieved some level of success, there still remains large classes of problems that are yet unsolved. One such class of problems is the assessment of behavior in determining meaningful profiles of entities relative to others within the same general peer group. Attempts at conducting computerized behavior profiling have been made, particularly in the health care industry, with little success.

One major difficulty in programming behavior profiling stems from a limiting factor present in most modern digital computer systems, binary logic. Digital computers, and the programming languages used to program them, are based on a logic system that supports only two truth states, represented as 0 (false) and 1 (true). This constraint poses significant challenges in dealing with large combinatorial problems that are more properly represented with a multi-valued logic.

Searching health care claims to detect physician fraud illustrates the complexity of behavior profiling problems.

To start, there are hundreds of known behavior characteristics that indicate, but do not prove, physician fraud. Behavior that is characteristic of fraudulent activity varies by medical specialty and geography, and, changes frequently. In addition, the relative importance of different fraudulent behavior characteristics varies and it is very difficult, if not impossible, to quantify the differences.

Adding further to the dynamics of physician profiling, of any kind, are the affects of medical advancement, health care reform and numerous other social and economic factors. Technologies constrained by discrete comparisons and a two-valued logic system are inadequate for coping with the intractable nature of this kind of problem.

One approach to this problem has been to encode what is known about physician fraud in If-Then statements, or rules, that can be used to test the claims of a physician for the presence of fraud. Several practical problems exist with this approach once it is understood that there is no clear and manageable subset of things that physicians do when engaging in fraudulent activity.

There are a wide range of factors that need to be examined simultaneously, and the result must be a composite evaluation of the overall behavior of the physician. The number of If-Then rules needed to test discrete values, or ranges of values, taking dozens or hundreds of constantly changing factors into account is nearly impossible to create, and is surely impossible to maintain.

Mathematical or statistical modeling is an alternative, and popular, method of conducting behavior profiling analysis that has fewer drawbacks but still falls short of a practical solution.

In this case, statistical normality for a peer group is calculated for a small manageable number of behavior characteristics known about a subject, such as physician fraud. For each physician in the peer group, a rigorous mathematical calculation is used to measure the combined degree to which that physician deviates from normal behavior for all behavior characteristics. This approach involves calculating a summary of standard deviations that identify the statistical outliers within the peer group.

This approach benefits from the objectivity achieved through peer group analysis, as opposed to arbitrary threshold limits set by domain experts, but lacks the flexibility and extensibility required of a meaningful and practical solution.

A purely statistical approach to physician profiling has been shown to be computationally impractical when dealing with a large number of frequently changing behavior characteristics. Changing or adding behavior characteristics, and applying varying weights for behavior characteristics can only be achieved by applying rigid mathematical formulas requiring careful scrutiny by highly skilled mathematicians. In many computing environments, especially business computing environments, this kind of skill is rare, and in many cases non-existent, in sufficient quantity to cope with the dynamics of physician profiling.

Another drawback to this approach is the tendency of statistical modeling to lose access to the detailed information used to derive its conclusions. This is especially important in profiling physician fraud where the investigation and prosecution process necessarily requires very specific evidence of wrong-doing.

One other approach to physician profiling that is often discussed but has rarely, if ever, been tried is the use of neural network technology to 'mine' claims databases to search for fraudulent physicians. In this case, a neural network would be provided a training set of known fraudulent profiles and it would be trained to recognize the characteristics of fraud by drawing relationships between the data elements in the training set. Once the training of the neural network is complete, it would then be used to scan the universe of physician data in search of physicians matching the neural networks 'learned' understanding of fraud.

A major, perhaps fatal, problem exists with this approach for physician profiling and for most other non-trivial profiling applications as well. A training set of data simply does not exist that is nearly large enough, or stable enough, to support the training phase of a neural network. Again, the dynamics of physician profiling, as well as many other behavior profiling applications, render this approach unsuitable.

Complex behavior profiling requires a solution that is flexible, extensible, domain independent, and can be routinely implemented in varying types of computing environments with commonly available skills.

OBJECTS OF THE INVENTION

An object of this invention is an improved system and method that is capable of determining behavior profiles, comprising a large number of behavior characteristics, for entities within a peer group.

Another object of this invention is an improved system and method that is expandable in that behavior characteristics of an entity can be added without restriction, to determine the behavior profile.

Another object of this invention is an improved system and method that is capable of determining behavior profiles of entities that have a large number of behavior characteristics where one or more of the characteristics is weighted to determine the profile.

A further object of this invention is an improved system and method for entity behavior profiling that is domain independent and highly transportable.

SUMMARY OF THE INVENTION

The present invention is a system and method for profiling the behavior of entities, that are members of a peer group, where the entities have common characteristics, exist in the same field of activity, or domain, and are generally expected to behave similar to one another.

Behavior profiling in the present invention detects abnormal or aberrant behavior that could be affecting a process in either an unusually positive or unusually negative manner. The behavior profile is designed to measure the degree to which each entity's behavior is similar or dissimilar to its peers. Dissimilar behavior can be either positive or negative depending on the object of the profile and the attributes, or behavior characteristics, chosen to measure the behavior of entities.

A novel feature of the present invention is the use of the principles of fuzzy logic as published by L. A. Zadeh and discussed in U.S. Pat. No. 5,167,005 to Yamakawa filed on Aug. 11, 1989 and U.S. Pat. No. 5,179,625 to Hisano filed on May 5, 1992 which are herein incorporated by reference in their entirety. The present invention novelly uses fuzzy logic principles to calibrate, measure and combine very subtle degrees of abnormal entity behavior and to establish an entity behavior profile.

First, behavior characteristics, or indicators of a target behavior, are determined. Norms and fuzzy sets are established for each behavior characteristic and then fuzzy logic is used to develop a series of scores. A behavior profile is developed from a collection of scores, and is organized either linearly or in a hierarchy, that can be used to compare the degree to which an entity within a peer group is, or is not, associated with a set of behavior characteristics relative to others in the same peer group.

Another novel feature of the present invention is that the number and organization of behavior characteristics comprising the behavior profile are expandable without restriction, and that the relative importance, or weight, of each behavior characteristic, or group of characteristics, can be achieved linguistically, not numerically.

The unrestricted expandability of the hierarchy of scores is achieved by performing multiple iterative fuzzy logic processes that are defined and controlled by information stored on a data file located on an external storage device.

Linguistic weighting of behavior characteristics is achieved by using linguistic terms, or hedges, to alter the fuzzy logic scoring process in accordance with the intended meaning of the hedge.

Another important and novel feature of the present invention is that it is void of any domain specific knowledge or expertise and operates independent of any particular field of activity allowing an unusually high degree of transportability.

Transportability is attained by representing domain knowledge (i.e. objects, hedges and fuzzy sets in fuzzy logic rules) as elements in multiple subscripted variables, or symbolic lists, that are populated from information stored on data files located on an external storage device.

BRIEF DESCRIPTION OF THE DRAWINGS

FIG. 7 is a data structure for storing the attributes of fuzzy sets.

FIG. 8 is a flow chart showing steps for defining scoring fuzzy sets that relate fuzzy truth values to scores that measure behavior.

FIG. 9 is a flow chart showing the steps for defining a hierarchy of scores that measure behavior.

FIG. 10 is a block diagram that shows the hierarchical relationship of scores that is expandable without restriction.

FIG. 12 is a data structure for storing a hierarchy of lower and higher behavior characteristics with linguistic variables indicating weights for each.

FIG. 13 is a generic data structure for storing the data required to quantify billing fraud and abuse behavior characteristics of health care providers.

DETAILED DESCRIPTION OF THE INVENTION

Figure 1:
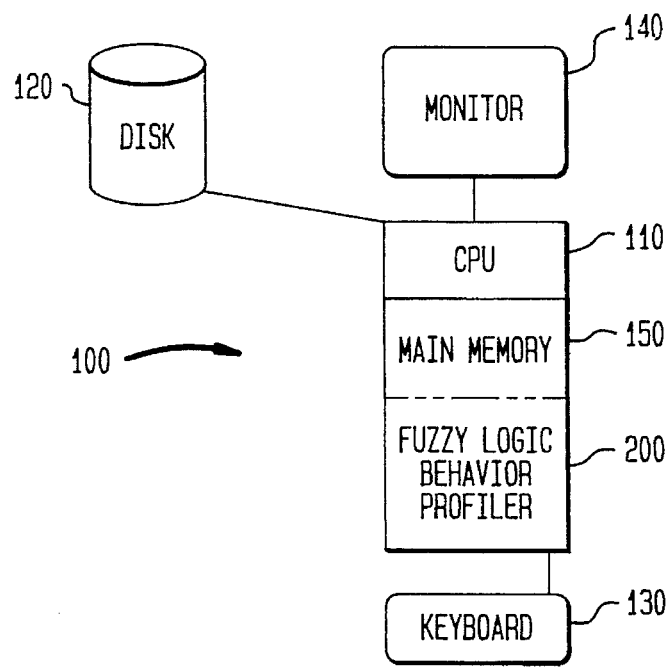
FIG. 1 is a block diagram showing a basic arrangement of a computer system that embodies the present invention.

FIG. 1 is a block diagram showing a system 100 embodying the present invention and comprising a CPU 110, Hard Disk Drive 120, Keyboard 130, Monitor 140, CPU Main Memory 150 and a portion of main memory where the fuzzy logic behavior profiler (method 200 shown in FIG. 2) resides and executes. One preferred embodiment of the system 100 is an IBM PS/2 model 95 with 24 megabytes of RAM, an Intel 486 66 MHz processor upgradeable to Pentium technology, running IBM's OS/2 operating system, with 2 gigabytes of disk storage and an 8514 monitor. A printer can also be included. Any general purpose computer with an appropriate amount of storage space is suitable for this purpose. Systems like this are well known.

Figure 2:
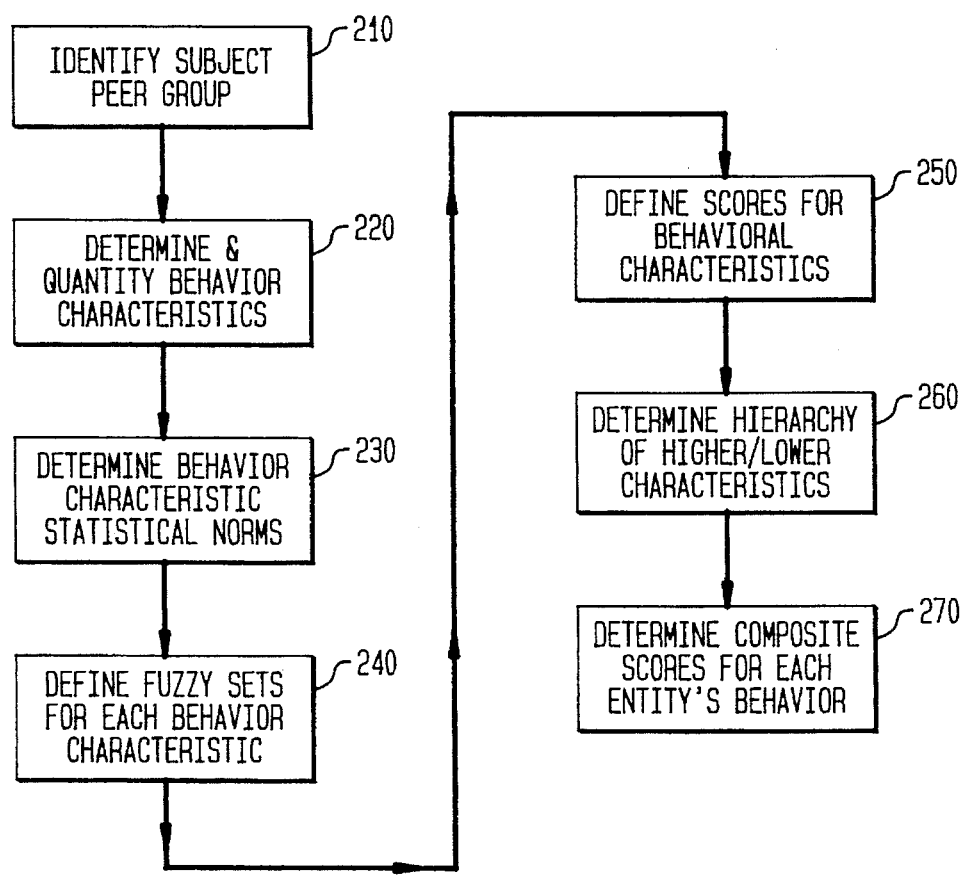
FIG. 2 is a flow chart showing the steps of a preferred embodiment of the present invention.

FIG. 2 is a flow chart of a preferred embodiment of the present method 200 of the invention that is used to design and build an Entity Behavior Profiler. The method 200 comprises the following steps: identifying subject peer group to be profiled 210; determining the behavior characteristics and quantifying the behavior characteristics that will be the object of the behavior profile 220; deriving statistical norms for each behavior characteristic 230; defining fuzzy sets for each behavior characteristic that will measure membership of an entity based on an amount of behavior characteristic 240; defining the scoring of fuzzy sets that translates membership of an entity within a behavior characteristic to scores 250; establishing relationships and relative weights between higher and lower behavior characteristics that will be represented as a hierarchy 260; and developing composite scores for the entities that represent overall compatibility with the target behavior based on the predefined hierarchy of behavior characteristics 270.

Figure 3:
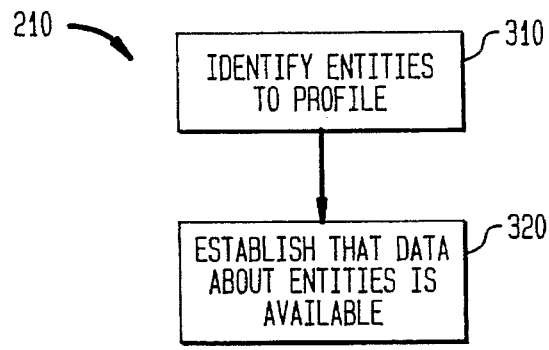
FIG. 3 is a flow chart showing steps for determining subject peer groups.

FIG. 3 is a flow chart 210 showing how subject peer groups are identified (210 of FIG. 2).

A key ingredient in defining peer groups is establishing that the entities being profiled have characteristics of sufficient similarity as to expect them to behave in a similar manner. The extent to which entities deviate from others in the same peer group reveals unique aspects of the behavior of those entities that can be used in making qualitative decisions.

To define a peer group 210, collect homogeneous, or like, entities 310 that have common characteristics and are generally expected to behave similar to one another. Based on the assumption that most, or all, entities in a peer group should behave similarly, the behavior profile is designed to measure the degree to which each entity behaves similar or dissimilar to its peers. Dissimilar behavior can be considered either positive or negative depending on the objective of the profile, or target behavior.

As an example, when profiling physicians, peer groups are typically comprised of physicians of the same medical specialty located in demographically similar geographies (e.g. Chiropractors in Los Angeles, Calif.). An entity in this peer group is an individual physicians 310. The intent is to compare the behavior of physicians engaged in the practice of medicine under similar social and economic conditions. Geographies, in this case, need only be demographically similar not necessarily contiguous, so that it may be appropriate to compare the behavior of chiropractors practicing in large metropolitan areas such as New York, Los Angeles and Chicago.

In the case of profiling the peer group 310 of physicians, for the target behavior (i.e. behavior characteristics) of fraudulent billing practices, those physicians (entities 310 within the peer group) measuring the greatest degree of abnormal activity, for a large number of behavior characteristics that are considered fraud indicators, can be reasonably suspected of fraud.

Physicians are only one peer group for which behavior profiles 310 can be determined in the domain of health care. Other peer group examples in health care include, professional clinics, hospitals, medical supply companies, ambulance service companies, labs and x-ray clinics, nursing homes and pharmacies. The data used to profile physicians and other peer groups in health care is generally health claims billing data that is commonly available in private health insurance companies and in government agencies responsible for administering public health care programs such as medicare.

As another example, when profiling cashiers in the retail industry, peer groups are typically defined as cashiers that handle similar types of merchandise in stores located in demographically similar geographies (e.g. cosmetics cashiers in stores located in Chicago). An entity in this peer group is an individual cashier. The intent is to compare the behavior of cashiers located in stores that conduct business under similar social and economic conditions. As is the case in physician profiling, geographies need only be demographically similar not contiguous. This is only one group of entities for which behavior profiles can be determined in the domain of retailing. Other examples of retail peer groups that can be profiled are departments within stores, entire stores, purchasing agents, and suppliers. The data used to profile cashiers is generally cash register transaction data commonly available on computer systems attached to point-of-sale devices (computerized cash registers).

In general, peer groups can be defined 310 in any domain, or field of activity, for which data exists to support the quantifying of the behavior characteristics comprising the behavior profile. Demographic similarity can be established in a number of ways or may not be a necessary element in the peer group definition.

For example, profiling the behavior, or performance, of stock portfolios probably bears no relationship to geography but may include some other element of commonality such as stock exchange (OTC, NYSE, Japan, London, Etc.).

Peer groups can also be defined as business units such as profit and loss units, branch offices within a company, stores in a retail chain, or local branches of a bank. In addition, the traditional corporate auditing function includes a wide range of needs to identify anomalous behavior that are used as early warning signs of declining business practices. Today, most corporate audits are conducted based on random sampling techniques that are hit and miss attempts to locate trouble spots in an organization. Business unit profiling 310 in the present invention has the advantage of evaluating 100% of the data to produce a comprehensive view of business unit performance against other business units expected to perform in a similar manner. Business unit performance data can be obtained from corporate computer systems including general ledger, accounting systems, auditing systems and other similar business systems.

Once the homogeneous collection of entities is identified 310, a peer group is further defined 210 by establishing that sufficient quantity and quality of data exists 320 in a form compatible with the System 100. A key element of the data used in profiling a peer group is that it be organized, or be organizable, according to the definition of the peer group and the data needed to quantify the behavior characteristics comprising the behavior profile is available for each entity in the peer group. As example refer to the data structures described in FIGS. 13 and 14 that for physicians and cashiers respectively.

The source of the data in each domain, or field of activity, is determined by the behavior characteristics and the information needed to quantify the behavior characteristics. As an example, the data used to profile physicians and other peer groups in health care is generally health claims billing data that is commonly available in private health insurance companies and in government agencies responsible for administering public health care programs such as medicare.

Other data that is available and can be used to quantify useful behavior characteristics can also be used. Examples of other sources of data in health care are summary statistics and other data produced by any number of cost containment software products currently available through third party vendors comprising the health care information market. These products analyze various individual aspects of health care provider billing activity that can be considered indicators of billing fraud and abuse. An example of such a product can be found in U.S. Pat. No. 5,253,164 granted to Holloway et al. filed on Jan. 29, 1991 and entitled "System and Method for Detecting Fraudulent Medical Claims via Examination of Service Codes" which is herein incorporated by reference.

The quantity of data required 320 is that which is needed to derive representative statistics for each behavior characteristic. For example, in a preferred embodiment, the mean, median, mode and standard deviation are derived for each behavior characteristic. The methods for performing these calculations and determining the amount of required data are well known. The period of time spanned by the data used to accumulate the required amount of data is referred to as the profiling horizon.

As an example, in a typical physician behavior profile the profiling horizon is 12 months. The profiling horizon selected for data collection purposes may vary by domain as in the case of cashier profiling in the retail industry. Since the volume of transaction data available on point-of sale devices is typically very high the profiling horizon in this case is only 10–12 weeks. Other profiling horizons are within the contemplation of the invention.

Figure 14:
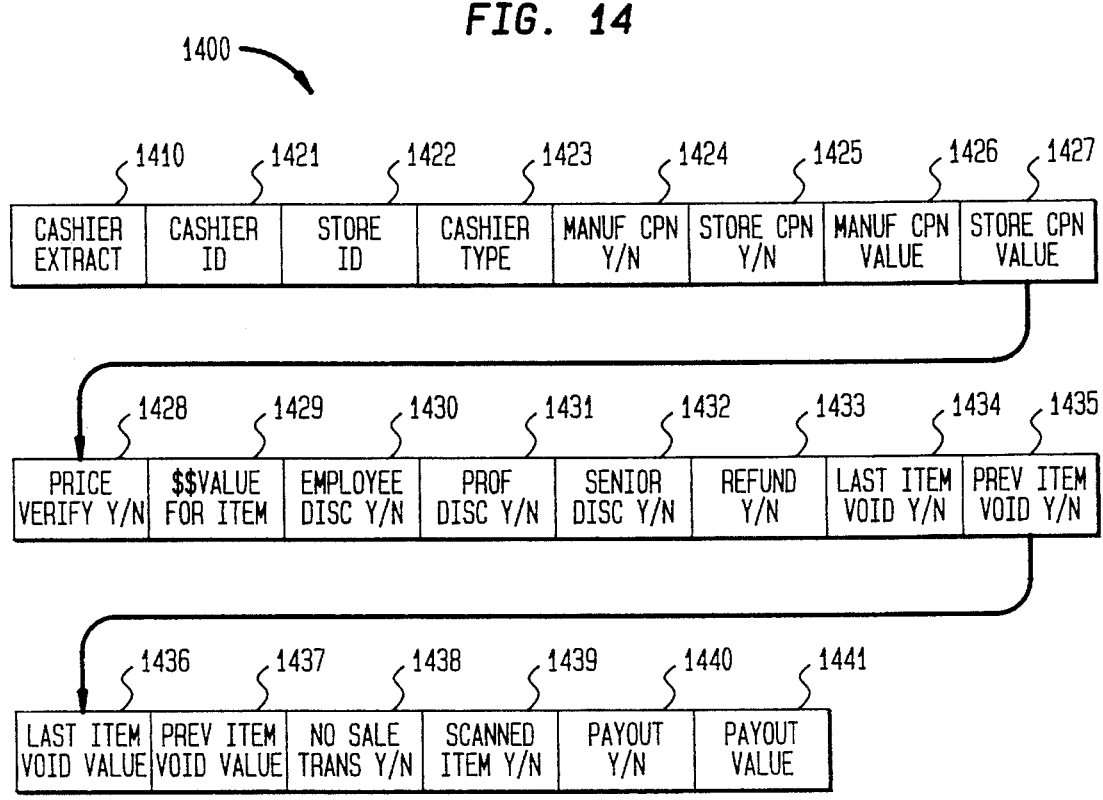
FIG. 14 is a generic data structure for storing data required to quantify fraudulent behavior by cashiers in the retail industry.

The specific data elements that need to be collected are the data elements required of the algorithms defined below (in the description of box 430 of FIG. 4) to quantify behavior characteristics. Examples of the data elements required to quantify behavior characteristics for physicians and cashiers are shown in FIGS. 13 and 14 respectively.

The quality of the data is established through traditional data analysis methods for verifying that the contents of source data fields actually contain what is expected and meets the needs as determined in the description of box 430.

In examples such as profiling corporate purchasing agents, data will come from various corporate computer systems that capture and store data relevant to purchasing transactions. Similarly, profiling employee travel expenses will require access to travel expense data by employee over an appropriate period of time. Profiling the performance of a company's sales force may require access to data from several sources such as a human resource system and a sales commission system.

Figure 4:
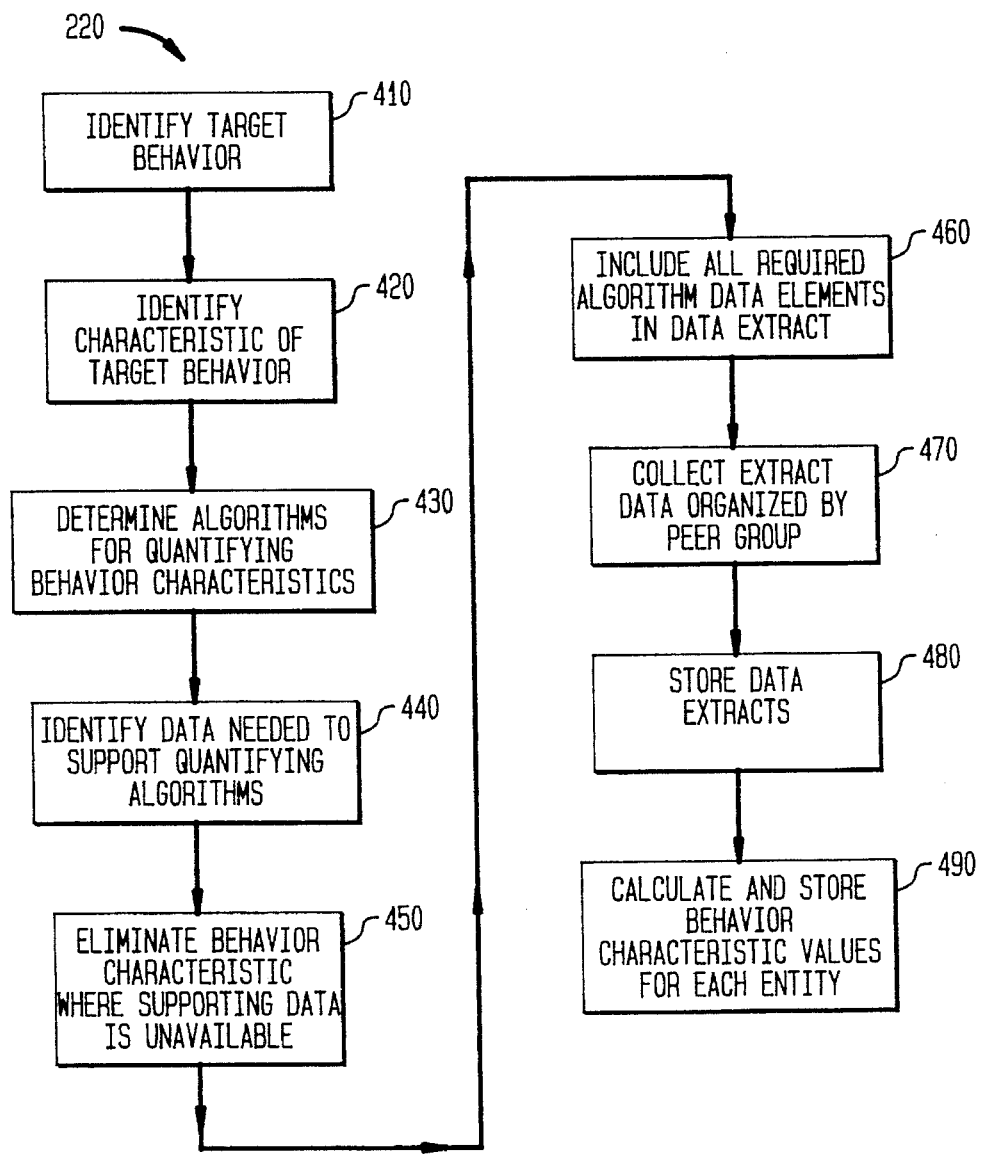
FIG. 4 is a flow chart showing steps for determining and quantifying behavior characteristics about a subject peer group.

FIG. 4 shows a preferred embodiment 220 of determining and quantifying behavior characteristics (220 of FIG. 2).

The first step 410 in determining and quantifying behavior characteristics is identifying the type of behavior the profiler will seek to identify within the peer group as the target behavior. This process is determined by a system designer (i.e. someone skilled in the design of computer systems) and a domain expert (i.e. someone knowledgeable in the field of activity in which the peer group entities exist) and is guided by the need for the profile.

As an example, it is estimated that in the U.S., almost 10% of the cost of health care includes some degree of fraudulent activity by health care providers. Of the $900+ billion spent on health care in the U.S. in 1993, almost $90 billion dollars can be attributed to provider fraud. The potential savings indicated by this statistic defines a business need to identify and control provider fraud. In this case, the target behavior is determined to be fraudulent billing activity and is established as the behavior the profiler will seek to identify within various physician peer groups.

As another example, employee dishonesty, including cashier fraud, in the retail industry is estimated to be as high as 2–5% of all retail sales. The potential savings indicated by this statistic defines a business need to identify and control cashier fraud. In this case the target behavior is determined to be cashier fraud and is established as the behavior the profiler will seek to identify within various cashier peer groups.

Similarly, in other domains, the system designer and domain expert must analyze the factors affecting the domain and identify target behaviors that, if detected by the profiler, meet a compelling need.

The identification of behavior characteristics 420 is performed by the system designer and the domain expert and is determined through an analytical process requiring a detailed understanding of the characteristics of the target behavior. A behavior characteristic is typically an indicator of target behavior. The objective of this step is to identify a collection of characteristics that, if found to be associated with an entity to a high degree, indicate that the entity is compatible with the target behavior.

As an example, when profiling physicians to search for fraud, there are many well known indicators of fraud that can be used as behavior characteristics. Some examples are: an abnormally high percentage of office visits taking place on Sundays and Holidays; an abnormally high percentage of office visits for patients living outside the normal geography of the physician's practice; an unusually high percentage of radiology visits; an unusually high average age for the patients of a pediatrician; an unusually high number of patients treated in a single day.

Similarly, when profiling cashier behavior, there are many types of cash register transactions that indicate suspect behavior such as: an unusually high number of No Sale transactions; an abnormally high percentage of Voided transactions; an unusually low percentage of Scanned sales; an unusually high percentage of Returns.

Each domain, peer group and target behavior will require the identification of behavior characteristics in a similar manner. Where behavior characteristics are not easily identified, relationships between the target behavior and a given set of behavior characteristics can be determined by using statistical analysis tools. An example of one such analysis tool is given in U.S. Patent application Ser. No. 07/854,921 to Rabenhorst filed on Mar. 20, 1992 which is herein incorporated by reference.

The next step 430 is to determine the algorithms for quantifying behavior characteristics or indicators of the target behavior. This step is performed by the system designer and domain expert and requires that the data elements, data transformation rules and process for quantifying each behavior characteristic 420 be determined.

As an example, in profiling physician behavior to search for fraud, a behavior characteristic such as an unusually high percentage of office visits on Sundays and Holidays is quantified by 1) defining the dates of all Sundays and Holidays occurring during the profile horizon, 2) defining all the procedure codes that comprise office visits, 3) summing all the procedures for a given physician where the procedure code matches a procedure code defined as an office visit, 4) summing all the office visit procedures for a given physician where the date of service matches one of the dates determined as a Sunday or Holiday, and 5) dividing the number of Sunday and Holiday office visits by the total number of office visits. The value for each behavior characteristic is stored on System component 120 in a form that is easily retrievable and relates to the specific provider and behavior characteristic.

The next step 440 is to identify the data elements required to support the calculation of each algorithm determined in step 430. This step is performed by the system designer and requires a well known process of data analysis whereby the data elements identified in the algorithms for quantifying each behavior characteristic are determined to be available in a format and operating environment compatible with the System 100 or can be transformed to be compatible with the System 100.

In step 450, if the data required to calculate a given behavior characteristic is determined to be unavailable or unusable, the behavior characteristic requiring the unavailable data will need to be modified to conform with more readily available data, or steps must be taken to make the required data available.

Step 460 requires the system designer to define a data structure that includes all the data elements determined in box 440. A novel organization of this data in the present invention is shown by example in FIGS. 13 and 14 for physician profiling and cashier profiling respectively.

In step 470 the system designer must define a process and generate the necessary software to extract the data necessary to populate the data structure defined in step 460 in such a way as to allow it to occur on a routine basis. The data file created in this step must be compatible with component 120 of System 100.

Step 480 requires that the system designer store the data file created in step 470 on component 120 of System 100.

In step 490 a computer program is executed to perform the steps required of the behavior characteristic algorithms determined in step 430. For each entity in a peer group, a value is derived for each behavior characteristic for the entity in accordance with the behavior characteristic algorithm and is stored using generally known methods on system component 120 in the data structure described in FIG. 25.

Figure 5:
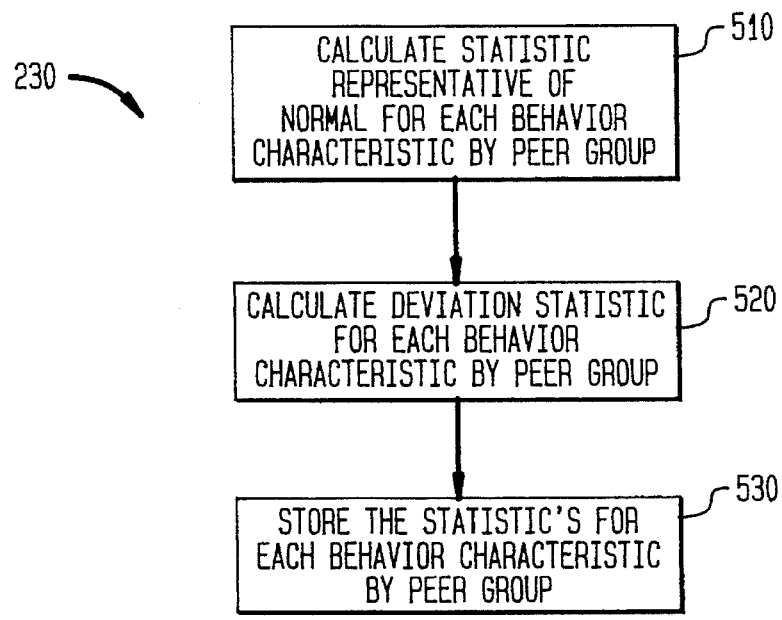
FIG. 5 is a flow chart showing steps for determining statistical norms for the behavior characteristics of a subject peer group.

FIG. 5 shows the steps to determining a statistic representative of 'normal' for each behavior characteristic (box 230 of FIG. 2).

For each behavior characteristic included in the behavior profile, representative statistics are created. In a preferred embodiment, values representing 'normal' and the standard deviation are used.

Step 510 is the calculation of a statistic representative of the 'norm' for each behavior characteristic. In a preferred embodiment of the present invention the mean, median and mode value for each behavior characteristic for each entity in the peer group is derived. Further, in a preferred embodiment, the end-user selects which one of these statistics is to be used to define 'normal' for the behavior characteristic. Methods of calculating the mean, median and mode are well known.

Step 520 is the calculation of a statistic that can be used to measure variance from the 'norm' 510. In a preferred embodiment, the standard deviation is derived for each behavior characteristic for all the entities in the peer group. The method of calculating this statistic is well known and is used to measure degrees of abnormality.

In step 530 the norm and deviation statistics for each behavior characteristic for the peer group are stored on system component 120.

Figure 6:
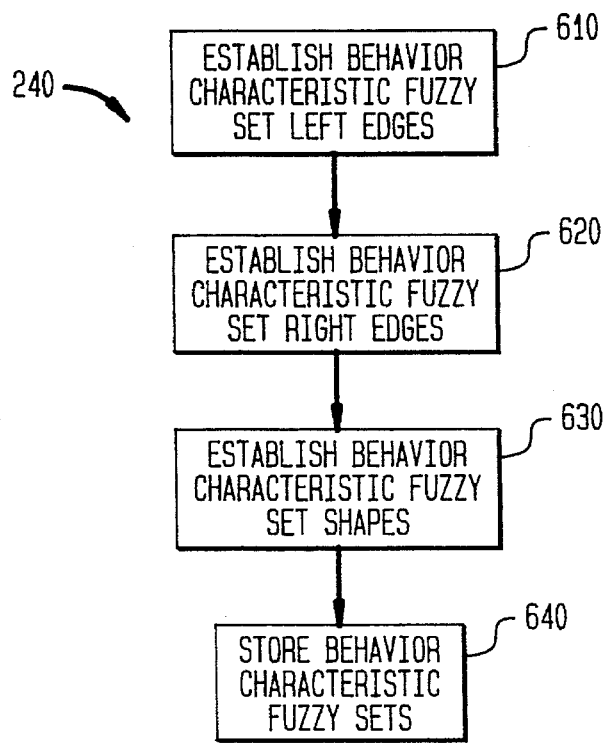
FIG. 6 is a flow chart showing steps for defining fuzzy sets for each behavior characteristic of a subject peer group.
Figure 21:
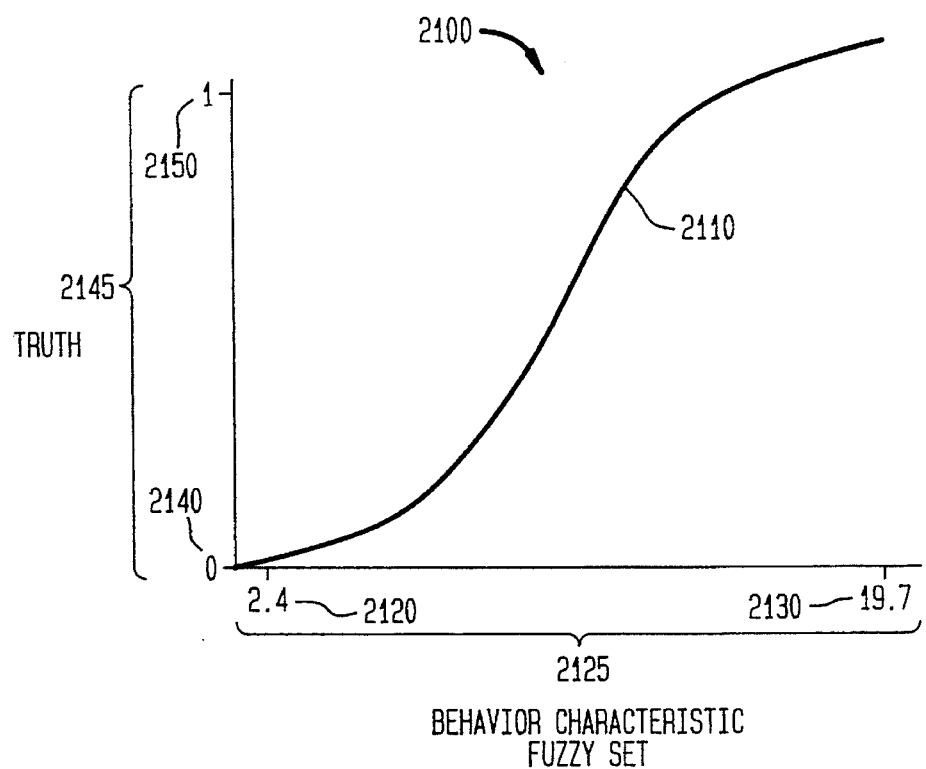
FIG. 21 is an example of a behavior characteristic fuzzy set.

FIG. 6 (step 240 in FIG. 2) shows the steps to developing fuzzy sets for each behavior characteristic. FIG. 21 illustrates the structure and components of a behavior characteristic fuzzy set.

A novel and important feature of the present invention is the use of fuzzy logic to develop a series of scores that measure the degree to which entities are associated with behavior characteristics.

The first step in this process is to create a fuzzy set for each behavior characteristic. One preferred fuzzy set 2100, shown in FIG. 21, represents a range of behavior characteristic values 2125, along the x-axis, such that a left edge of the fuzzy set 2120 is the lowest expected behavior characteristic value, and a right edge of the fuzzy set (2130) is the highest expected behavior characteristic value. Other structures of fuzzy sets that show the relationship between degrees of membership in a fuzzy set and association with a behavior characteristic are within the contemplation of the invention.

A preferred embodiment establishes defaults for automatically setting the left and right edges of a fuzzy set as described below but also allows these defaults to be modified by an end-user.

Using FIG. 21 as an example of a physician profiling behavior characteristic is the percentage of Sunday and Holiday visits performed. The x-axis shows the range (2.4%–19.4%) of values 2125 of the peer group for that behavior characteristic. The y-axis shows the range (0 to 1) of truth values 2145 of an entity (physician) indicating the degree of membership (or truth) that a particular entity (physician) has for that behavior characteristic.

The left edge of the fuzzy set in this case is 2.4%, indicating this as the normal percentage of visits occurring on Sundays and Holidays for the peer group. Physicians having values for this behavior characteristic at, or near, 2.4% are behaving normally (see the discussion of "normal" and FIG. 5 above) a near zero (0) truth within the set of abnormal physicians for this behavior characteristic (i.e. % Sunday/Holiday Visits).

The right edge is shown as 19.7% indicating this as a completely abnormally high percentage of Sunday and Holiday visits for the peer group. Physicians having values for this behavior characteristic at, or near, 19.7% are behaving abnormally and therefore will have truth value near one (1) within the set of abnormal physicians for this behavior characteristic (i.e. % Sunday/Holiday Visits).

Along the y-axis is a range of truth values 2145 between zero (0) and one (1), where zero (0) indicates no truth 2140, or membership, in the set of entities associated with the behavior characteristic, and one (1) indicates complete truth 2150, or membership, in the set of entities associated with the behavior characteristic. Y-axis values between zero and one indicate partial membership in the set of entities associated with the behavior characteristic.

The fuzzy set curve 2110, or surface 2110, indicates the relationship between truth values (a degree of membership of a physician for the behavior characteristic) on the y-axis and behavior characteristic values (High % Sun/Hol Visits) on the x-axis. In FIG. 21 the fuzzy set surface 2110 shown is an inclining growth curve 2110.

Figure 22:
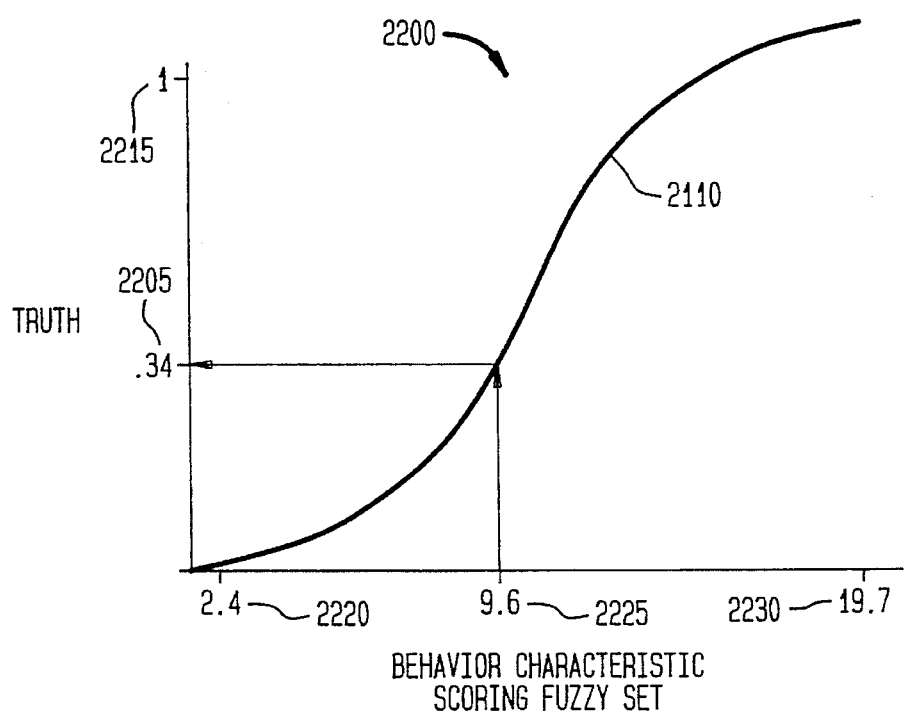
FIG. 22 shows how truth values are determined from behavior characteristic fuzzy sets.

Fuzzy Sets are used in the present invention to measure the degree to which an entity is associated with each individual behavior characteristic. Alternatively stated, it is a measure of the degree of membership of the entity (physician) for the behavior characteristic (High % Sun/Hol visits). As shown by FIG. 22 a truth value 2205 is derived by mapping the behavior characteristic value for a given entity 2225 (stored on system component 120 as described in step 490), to the behavior characteristic fuzzy set curve (FIG. 21 ), which is constructed in the manner described in 610, 620 and 630 below. For example, an entity (physician) with a behavior characteristic (High % Sun/Hol Visits) value of 9.6% has a degree of membership (truth) of 0.34 within the fuzzy set describing High % Sun/Hol visits for the peer group.

The creation (design and building) of the fuzzy sets used in this process is done using the behavior characteristic norm developed in step 510, the behavior characteristic deviation statistic developed in step 520, and the definition of the behavior characteristic as determined in step 420. In a preferred embodiment of the present invention the data structure shown in FIG. 7 is used to represent the shape of each fuzzy set developed in these steps. This data structure is used by the behavior profiler to dynamically form the fuzzy sets used to measure abnormality.

Generally, a preferred fuzzy set is defined by 'setting' the left edge 2120, 'setting' the right edge 2130, and selecting the fuzzy set curve 2110. The following description explains how the left and right edges are set and how the fuzzy set surface is selected.

Step 610 describes how the left edge of the fuzzy set should be set in various circumstances. If the behavior characteristic as determined in step 320 indicates that the target behavior identified in step 310 when an entity's value for the behavior characteristic is above normal for the peer group then the left edge of the fuzzy set (representing no membership within the behavior characteristic) is set to the statistical norm 510. In this case, entities with behavior characteristic values near the statistical norm 510 indicates that the entity is behaving within the general bounds of 'normal' for the peer group (i.e. no or limited membership in the behavior characteristic).

For example, in FIG. 21, the degree of membership of an entity in the behavior characteristic (e.g. High % Sun/Hol Visits), is determined by the degree to which the entity's behavior characteristic value is above the statistical norm 510, or, behavior characteristic left edge (2.4%).

If the behavior characteristic 320 indicates the target behavior 310 when an entity's value for the behavior characteristic is below normal for the peer group then set the left edge of the fuzzy set (representing total membership within the behavior characteristic) to the statistical norm 510 minus a multiple of the deviation statistic 520. A preferred embodiment, in this case, sets the left edge to the statistical norm 510 minus 2.5 times the deviation statistic 520 and allows the end-user to modify the value of the multiple. In this case, entities with behavior characteristic values significantly below the statistical norm 510 indicates that the entity is behaving below the general bounds of 'normal' for the peer group.

Figure 16:
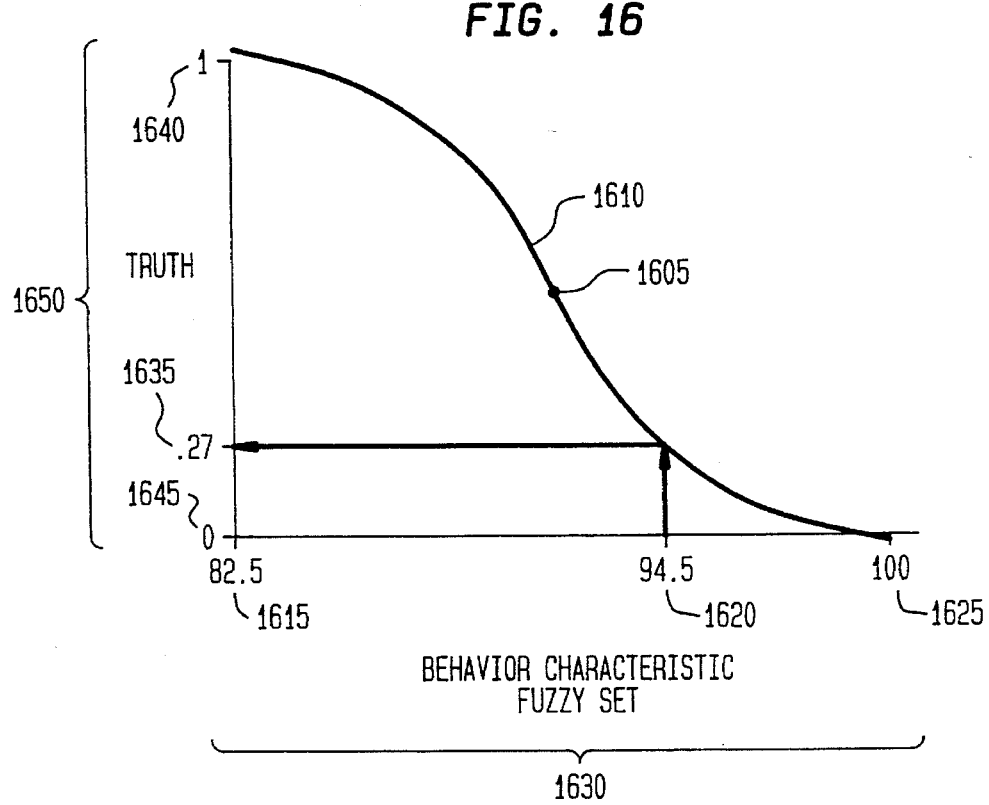
FIG. 16 is a generic declining growth curve fuzzy set.

For example, in FIG. 16, the degree of membership (0.27) 1635 of an entity (e.g. Cashier) in the behavior characteristic (e.g. Low % Scanned Items), is determined by the degree to which the entity's (cashier's) behavior characteristic value (94.5%) 1620 is below the behavior characteristic right edge (100%) 1625.

If the behavior characteristic 320 indicates the target behavior 310 when an entity's value for the behavior characteristic is neither abnormally high nor abnormally low relative to the statistical norm 510 (i.e. at or near the statistical norm 510), then set the left edge of the fuzzy set (representing no membership within the behavior characteristic) to the statistical norm 510 minus a multiple of the deviation statistic 520. A preferred embodiment, in this case, sets the left edge to the minimum value for the behavior characteristic found for any entity in the peer group.

In this case, entities with behavior characteristic values at or near the minimum indicates that the entity is behaving completely below the general bounds of 'normal' for the peer group (i.e. no or limited membership in the behavior characteristic).

Figure 17:
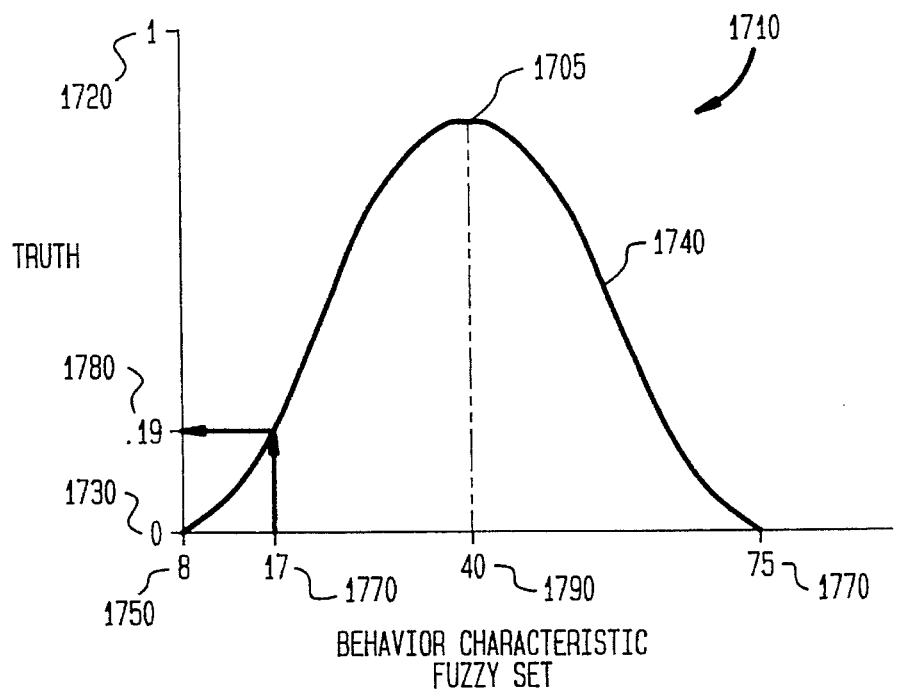
FIG. 17 is a generic bell curve fuzzy set.

For example, in FIG. 17, the degree of membership (0.19) 1780 of an entity (e.g. physician) in the behavior characteristic (e.g. Middle-Aged Patient Population), is determined by the degree to which the entity's (physician's) behavior characteristic value (17) 1770 is to the right of the behavior characteristic left edge (8) 1750 and near the behavior characteristic statistical norm (40) 1790.

If the behavior characteristic 320 indicates the target behavior 310 when an entity's value for the behavior characteristic is either abnormally high or abnormally low relative to the statistical norm 510, then set the left edge of the fuzzy set (representing total membership within the behavior characteristic)to the statistical norm 510 minus a multiple of the deviation statistic 520. A preferred embodiment, in this case, sets the left edge to the minimum value for the behavior characteristic found for any entity in the peer group. In this case, entities with behavior characteristic values at or near the left edge value indicates that the entity is behaving completely below the general bounds of 'normal' for the peer group (i.e. full or nearly full membership in the behavior characteristic).

Figure 18:
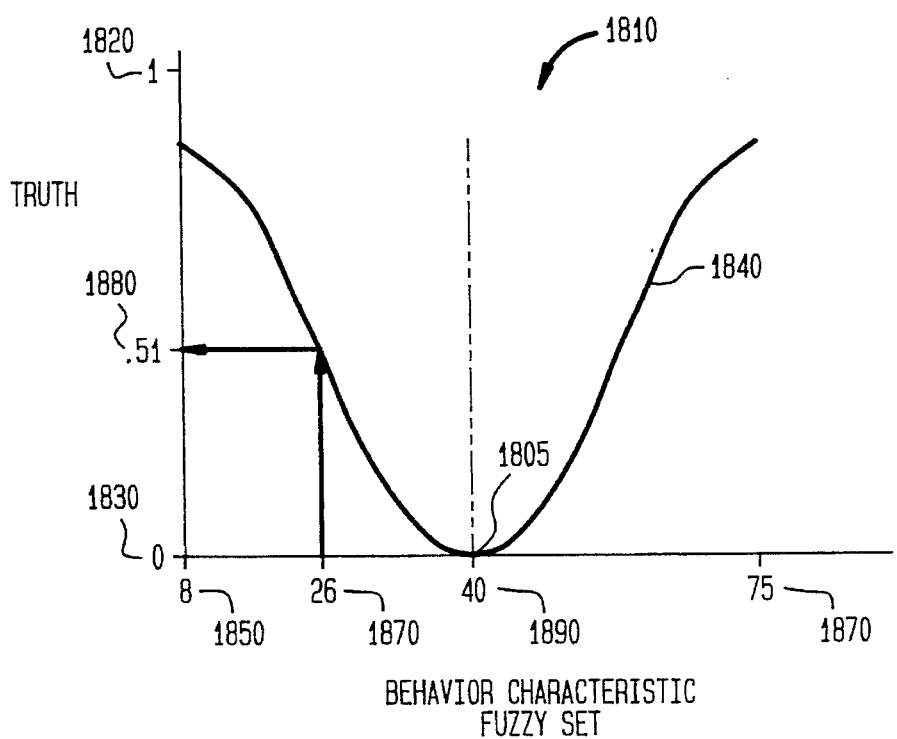
FIG. 18 is a generic inverted bell curve fuzzy set.

For example, in FIG. 18, the degree of membership (0.51) 1880 of an entity (e.g. physician) in the behavior characteristic (e.g. Unusually High or Low Avg Patient Age), is determined by the degree to which the entity's (physician's) behavior characteristic value (26) 1870 is above or below the behavior characteristic statistical norm (40) 1890.

Step 620 describes how the right edge of the fuzzy set should be set in various circumstances. If the behavior characteristic as determined in step 320 indicates the target behavior identified in step 310 when an entity's value for the behavior characteristic is above normal for the peer group then set the right edge of the fuzzy set (representing total membership within the behavior characteristic) to the statistical norm 510 plus a multiple of the deviation statistic 520. A preferred embodiment sets the right edge to the statistical norm 510 plus 2.5 times the deviation statistic 520 and allows the end-user to modify the value of the multiple. In this case, entities with behavior characteristic values at or above this value indicates that the entity is behaving completely above the general bounds of 'normal' for the peer group.

If the behavior characteristic as determined in step 320 indicates the target behavior identified in step 310 when an entity's value for the behavior characteristic is below normal for the peer group then set the right edge of the fuzzy set (representing no membership within the behavior characteristic) to the statistical norm 510 plus a multiple of the deviation statistic 520. A preferred embodiment sets the right edge to the statistical norm 510 plus 2.5 times the deviation statistic 520 and allows the end-user to modify the value of the multiple. In this case, entities with behavior characteristic values near the mean, median or mode indicates that the entity is behaving within the general bounds of 'normal' for the peer group.

If the behavior characteristic 320 indicates the target behavior 310 when an entity's value for the behavior characteristic is neither abnormally high nor abnormally low relative to the statistical norm 510 (i.e. at or near the statistical norm 510), then set the right edge of the fuzzy set (representing no membership within the behavior characteristic) to the statistical norm 510 plus a multiple of the deviation statistic 520. A preferred embodiment, in this case, sets the right edge to the maximum value for the behavior characteristic found for any entity in the peer group. In this case, entities with behavior characteristic values at or near the maximum indicates that the entity is behaving completely above the general bounds of 'normal' for the peer group (i.e. no or limited membership in the behavior characteristic).

For example, in FIG. 17, the degree of membership (0.19) 1780 of an entity (e.g. physician) in the behavior characteristic (e.g. Middle-Aged Patient Population), is determined by the degree to which the entity's (physician's) behavior characteristic value (17) 1770 is to the left of the behavior characteristic right edge (75) 1770 and near the behavior characteristic statistical norm (40) 1790.

If the behavior characteristic 320 indicates the target behavior 310 when an entity's value for the behavior characteristic is either abnormally high or abnormally low relative to the statistical norm 510, then set the right edge of the fuzzy set (representing total membership within the behavior characteristic) to the statistical norm 510 plus a multiple of the deviation statistic 520. A preferred embodiment, in this case, sets the right edge to the maximum value for the behavior characteristic found for any entity in the peer group. In this case, entities with behavior characteristic values at or near the minimum indicates that the entity is behaving completely below the general bounds of 'normal' for the peer group (i.e. full or nearly full membership in the behavior characteristic).

For example, in FIG. 18, the degree of membership (0.51) 1880 of an entity (e.g. physician) in the behavior characteristic (e.g. Unusually High or Low Avg Patient Age), is determined by the degree to which the entity's (physician's) behavior characteristic value (26) 1870 is above or below the behavior characteristic statistical norm (40) 1890.

Figure 15:
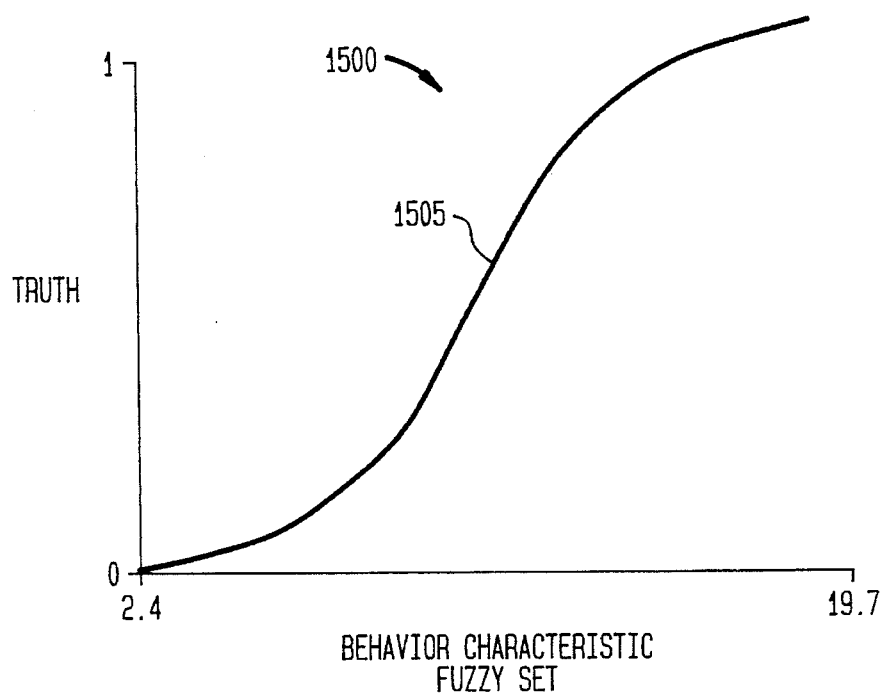
FIG. 15 is a generic inclining growth curve fuzzy set.

Step 630 describes how the shape of the fuzzy set surface should be set in various circumstances. In a preferred embodiment, if the behavior characteristic as determined in step 320 indicates the target behavior identified in step 310 when an entity's value for the behavior characteristic is above normal for the peer group, then as a default set the shape of the fuzzy set as an inclining growth curve and as a further default set the inflection point 1505 midway between the left edge of the fuzzy set and the right edge of the fuzzy set. The inflection point 1505 can be anywhere between the left and right edges of the fuzzy set and a preferred embodiment allows the default inflection point to be modified by an end-user. An example of an inclining growth curve fuzzy set is shown in FIG. 15.

In a preferred embodiment, if the behavior characteristic as determined in step 320 indicates the target behavior identified in step 310 when an entity's value for the behavior characteristic is below normal for the peer group, then set the shape of the fuzzy set as a declining growth curve with an inflection point 1605 midway between the left edge of the fuzzy set and the right edge of the fuzzy set. An example of a declining growth curve fuzzy set is shown in FIG. 16.

In a preferred embodiment, if the behavior characteristic as determined in step 320 indicates the target behavior identified in step 310 when an entity's value for the behavior characteristic is neither above normal for the peer group or below normal for the peer group, then as a default, set the shape of the fuzzy set as bell curve and as a further default set the apex 1705 of the curve halfway between the left edge of the fuzzy set and the right edge of the fuzzy set. The apex 1705 can be anywhere between the left and right edges of the fuzzy set and a preferred embodiment allows the default apex to be modified by an end-user. An example of a bell curve fuzzy set is shown in FIG. 17.

If the behavior characteristic as determined in step 320 indicates the target behavior identified in step 310 when an entity's value for the behavior characteristic is either above normal for the peer group or below normal for the peer group, then as a default set the shape of the fuzzy set as an inverted bell curve and as a further default set the midpoint 1805 halfway between the left edge of the fuzzy set and the right edge of the fuzzy set. The midpoint 1805 can be anywhere between the left and right edges of the fuzzy set and a preferred embodiment allows the default midpoint point to be modified by an end-user. An example of an inverted bell curve fuzzy set is shown in FIG. 18.

Other continuous or discontinuous functions can be used to define fuzzy set surfaces that represent behavior characteristics in a similar manner as described in 610, 620 and 630 above and are contemplated by the present invention. These functions can be user selected.

As an alternative preferred method of specifying the boundaries and shape of behavior characteristic fuzzy sets, a set of truth pairs, or coordinates, can be used. In this method, a minimum of two truth values (for zero (0) and one (1)) are paired with their corresponding behavior characteristic values; these coordinates are then used to plot the fuzzy set surface. This method can be chosen in the event that a desired default fuzzy set surface cannot be adequately defined as a standard function such as inclining/declining growth curves or upright/inverted bell curves. The user can provide pairs of truth and behavior characteristic values that are used to plot the fuzzy surface.

In step 640, each behavior characteristic fuzzy set is stored on system component 120 in the format of the data structure shown in FIG. 7.

FIG. 7 is a preferred data structure 700 for storing fuzzy sets. This data structure represents the shape of the fuzzy set surface and is used to dynamically construct and alter fuzzy set definitions.

A preferred embodiment of the fuzzy set data structure 700 is as follows:

```
01 Fset_Record.
   05 Identifier           Char(16),
   05 Description          Char(60),
   05 Minimum              Fixed Dec (15,4),
   05 Maximum              Fixed Dec (15,4),
   05 Statistical_Norm     Fixed Dec(15,4),
   05 Function             Char(16),
   05 Coordinates(101)     Char(12).
```

Element 710 is the name by which the overall data structure is referred.

Element 720 is a field that uniquely identifies an entity and typically is a number tied to the entity or the entity name, sixteen (16) characters in length. For example, for physicians the tax id can be used, and for cashiers the social security number or employee number can be used.

Element 730 is a field that contains comments or descriptive information about the fuzzy set, that the record 710 is attempting to describe. Typically, this can be sixty (60) characters in length.

Element 740 is the minimum behavior characteristic value found for any entity for a behavior characteristic. For example, in FIG. 15 the minimum value is shown as 2.4.

Element 750 is the maximum behavior characteristic value found for any entity for a behavior characteristic. For example, in FIG. 15 the maximum value is shown as 19.7.

Element 760 is the statistical norm 510 for the behavior characteristic. A preferred embodiment of the present invention offers the end-user the choice of selecting the statistical technique used to derive this value. For example in FIG. 17 the statistical norm is shown as the midpoint 1790 of a bell curve with a value of 40.

Element 770 is the function that describes the shape of the fuzzy set using standard built-in functions. Examples of these are linear, inclining growth, declining growth, bell, and inverted bell shown respectively in FIGS. 19, 15, 16, 17, 18.

Fuzzy sets can be defined using the Function 770 together with the Minimum 740, Maximum 750 and Statistical Norm 760 fields, or alternatively, fuzzy sets can be defined with a set of truth pairs that describe the coordinates 780 of the fuzzy set. A preferred embodiment of the present invention allows up to 101 truth pairs to be used to define fuzzy set surfaces that cannot be adequately described with standard functions.

One skilled in the art, given this disclosure, could develop equivalent data structures 700 that are contemplation within of this invention.

Scores need to be developed for each of the one or more behavioral characteristics. In a preferred embodiment, one or more sets of behavioral characteristics are novelly grouped together in one or more respective groups of behavioral characteristics and a composite "group level score" is developed for each group. Further, composites scores can be developed, at a higher level, for the composite scores of all the groups. See the discussion of FIG. 10 about the novel hierarchical structure.

Figure 11:
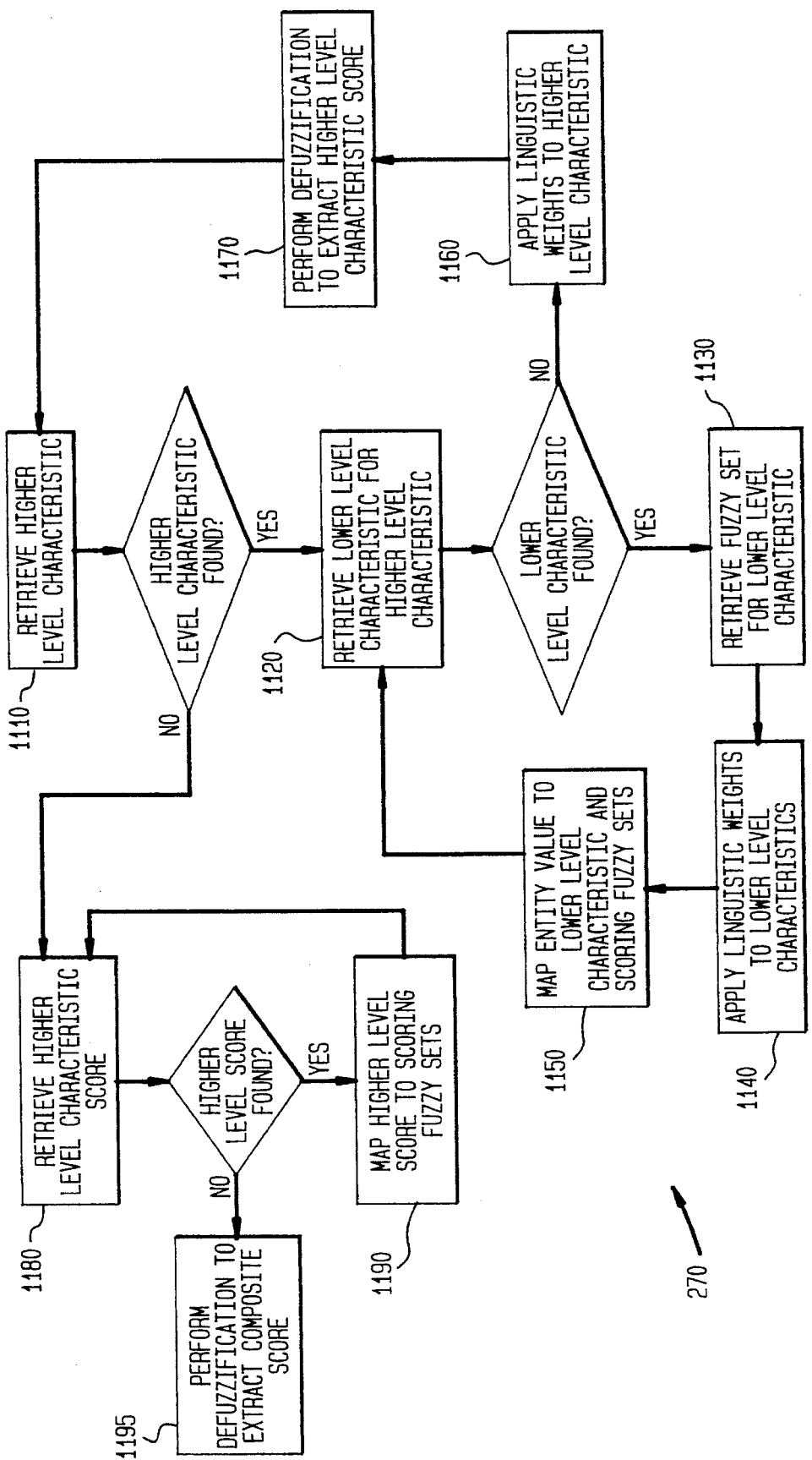
FIG. 11 is a flow chart that shows the steps for constructing a composite score from an unrestricted hierarchy of lower level characteristics and higher level characteristics using fuzzy inferencing and fuzzy reasoning.

FIG. 8 shows the steps to define scoring fuzzy sets that will be used in FIG. 11 to develop the scores described by the hierarchy defined in FIG. 10.

In step 810 a high level scoring fuzzy set is preferrable established by setting the left and right edges of the scoring axis of the fuzzy set wide enough apart to achieve the level of scoring granularity required to distinguish entities with similar characteristics from one another. As an example, if there are hundreds of entities in a peer group and the scoring fuzzy set ranges from 1 to 10, many entities will fall into each of the ten possible scores and become indistinguishable. When the scoring axis is expanded, e.g., to a range from 1 to 10 to a range from 1 to 1000, each behavior characteristic is easier to distinguish.

Figure 20:
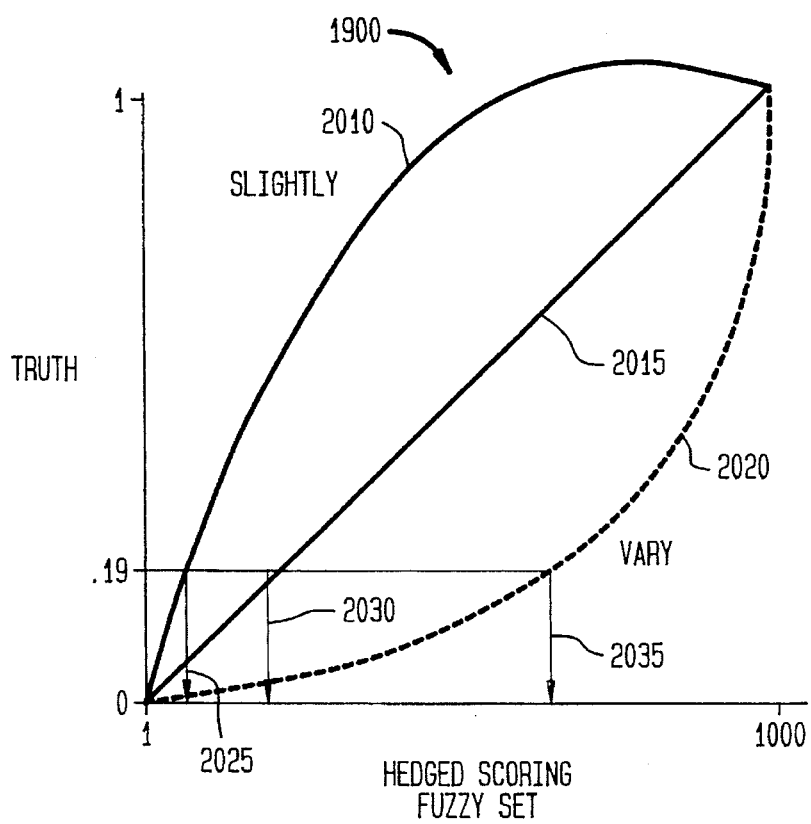
FIG. 20 is an example of how a linear scoring fuzzy set is altered by linguistic variables, or hedges.

In a preferred embodiment, the scoring fuzzy set has a left edge of 1 and a right edge of 1000; a preferred shape of the fuzzy set is a linear curve that has been modified by the hedge 'very'. FIG. 20 shows a scoring fuzzy set with a left edge of 1, a right edge of 1000, and a linear surface that has been altered with the hedge 'VERY'. High scores indicate that the entity has a high association with the characteristics used to develop the score.

Hedges, as described below, influence the resulting score based on a given truth value for a behavior characteristic that is obtained using the hedged scoring fuzzy set. For example, in FIG. 17 a truth value 1780 of 0.19 is derived by mapping a value 1770 of 17 into the behavior pattern fuzzy set 1710. The score resulting from this truth value 1780 of 0.19 will vary depending on the shape of the scoring fuzzy set.

For example, as shown in FIG. 20, a truth value of 0.19 will derive increasingly higher scores when mapped against each of the scoring fuzzy sets 2010, 2015 and 2020 respectively. As further indicated in FIG. 20 the hedge VERY derives a considerably higher score than that derived by mapping the same truth value (0.19) into the scoring fuzzy hedged with SLIGHTLY.

There are many other ways to construct scoring fuzzy sets with differing score ranges and fuzzy set surfaces (2010, 2015, 2020) that are contemplated by the present invention. This scoring fuzzy set surface will achieve the desired level of granularity needed to pull apart entities with similar behavior profiles and give more rapid scoring acceleration to entities exhibiting strong association with the behavior characteristics.

As an example, a physician or a cashier whose behavior characteristics derive many truth values that are high when mapped to the corresponding behavior characteristic fuzzy sets (as shown in FIG. 22) will result in high scores when mapped into scoring fuzzy set (2200) relative to other entities with correspondingly lower truth values for the same behavior characteristics.

In step 820 a fuzzy set is developed in a manner similar to that described in 810. However, this fuzzy set, called a group score fuzzy set (shown in FIG. 24), determines the degree/amount of membership of the group scores (see below) contributing to the behavior profile. High group scores indicate that the lower level characteristics, used to develop the group score, have a higher contribution in the behavior profile.

The composite score (1007 in FIG. 10) is developed by combining the group scores (1017, 1027, 1037, 1047). This is done by mapping each of the group score values into the group score fuzzy set 820 shown in FIG. 24.

In step 830 the scoring fuzzy sets developed in steps 810 and 820 are stored on system component 120.

FIG. 9 is a flow chart showing the steps to build a hierarchy 1000 of higher and lower characteristics for a behavior profile. This process is performed by the system designer and the domain expert and results in the definition of the hierarchy of scores (FIG. 10) that will be developed for the behavior profile.

In many instances behavior characteristics can be logically grouped together to form a hierarchy of scores. The hierarchy of scores is shown in FIG. 10. FIG. 10 comprises scores for each behavioral characteristic (typically 1011–1014, 1021–1024, 1031–1034, and 1041–1044.) The scores are organized in groups (1010, 1020, 1030, and 1040, respectively) whereby a higher level characteristic group score is a measure of the lower level characteristic scores subordinate to the higher level characteristic group.

The method and purpose of defining groups of lower level characteristics is illustrated by the following non-limiting example. When profiling physician behavior to search for fraud, behavior characteristics fall into at least three logical higher level characteristics or groups; volume, billing and practice-specific characteristics.

Volume characteristics measure counts of various aspects of a medical practice such as number of patients, number of claims, number of procedures, and so on. Billing characteristics measure dollar amounts of various aspects of a medical practice such as total dollars charged, average dollars charged per patient, average dollars charged per procedure, and so on. Volume and billing characteristics tend to be generic and apply across most medical specialty peer groups. Practice-specific characteristics tend to be clinical in nature and measure events that are specific to the practice of a particular medical specialty. As an example is a chiropractor-specific characteristic such as the average number of spinal manipulation procedures performed per patient in a two week period.

In the present invention the behavior profiler develops scores for each higher level characteristic or group which is the combination of the scores for each of the lower level characteristics that belong to each higher level characteristic. The highest level score is the composite score which is the result of combining all the higher level characteristic scores. In the physician profiling example each of the volume, billing and practice higher level scores represent the degree to which a physician deviates from the peer group for each logical grouping of lower level characteristics. The composite score combines the higher level scores and represents the degree to which a physician deviates from the peer group for all the higher and lower level characteristics combined.

This novel method of organizing and scoring behavior characteristics in an expandable hierarchy provides an unusually high degree of flexibility in measuring the behavior of entities that have large numbers of frequently changing behavioral characteristics. As an example, when profiling physician behavior to search for fraud, there are hundreds of known behavioral characteristics that change frequently and vary depending on the medical specialty of the physician and the geographic location of the physician's medical practice. A problem as dynamic and complex as this requires the degree of flexibility made possible by this novel method of organizing and scoring behavior characteristics in an expandable hierarchy.

FIG. 9 is a flow chart showing the steps of constructing the hierarchy of scores 1000.

In step 910 the higher level characteristics or logical groupings of lower level characteristics are identified. This process is performed by the system designer and the domain expert and is accomplished by reviewing all the behavior characteristics 420 and determining if logical groupings or sub-categories of behavior characteristics exist. The overall purpose of creating higher level characteristics is to increase the information content of the behavior profile by producing scores that represent logical components of entity behavior. If no higher level characteristics can be defined, than a one dimensional hierarchy (e.g. linear) exists which produces only the high level composite score and the individual behavior characteristic scores.

In step 920 relative weights are assigned to each behavior characteristic by the domain expert and system designer. The assignment of weights can be done in many ways such as assigning numerical weights indicating the relative importance of a behavior characteristic.

In a preferred embodiment, weighting is performed linguistically using "hedges" which are words that describe the relative importance of behavior characteristics. Some examples of hedges, included in a preferred embodiment are 'very', 'somewhat', 'extremely', 'slightly', and 'not' and each describes the relative importance of a behavioral characteristic. Further, a preferred embodiment will, by default, treat all behavioral characteristics as having equal weight, but provide an end-user with the ability to modify the hedges assigned to behavioral characteristics.

Hedges are surface modifiers and serve to change the shape of the fuzzy set they act upon in accordance with the linguistic meaning of the hedge. FIG. 20 illustrates the effects of two hedges 2010, and 2020 called 'slightly' and 'very' respectively.

Considering the fuzzy rule described further below:

If A is in B then

C is in D to assign greater importance to behavior characteristic A, this rule is modified as follows:

If A is in B then

C is in VERY D

The affect of the hedge 'VERY' on a linear scoring fuzzy set D is illustrated in FIG. 20 and results in the intensified curve 2020. The impact of applying the hedge 'VERY' is to accelerate the contribution of A to the CFR as the truth of the premise ('A is in B') increases.

The benefit of this novel feature of the invention is to simplify the assignment of weights to behavior characteristics through the use of more natural linguistic expressions as opposed to the assignment of numeric weights.

The following is an example of a fuzzy statement used to represent the behavior characteristic, high percent of office visits on Sundays and Holidays. In this example the hedge 'VERY' is used to give greater importance to this behavior characteristic than for other behavior characteristics. The effect of this weighting is to accelerate the score assigned to entities whose value for this behavior characteristic drifts toward the high end of the fuzzy set Abnormally_High.

If %_Sunday_Hols_Visits is Abnormally_High

Then

Fraud_Score is VERY Elevated

As known in the prior art, hedges have either a dampening (2010) or an intensifying (2020) affect on the contribution to the score being developed in accordance with the linguistic meaning of the hedge. For example, the hedge 'very' (2020) will intensify or increase the effect of the higher level characteristic, while the hedge 'slightly' (2010) will dampen the effect of the higher level characteristic. FIG. 20 shows of the effects of the hedge 'very' and 'slightly' on a linear scoring fuzzy set.

In step 930 associate the behavior characteristics defined in step 420 to the appropriate higher level characteristics 910 using the data structure shown in FIG. 12.

FIG. 12 is a preferred data structure 1200 for storing the hierarchical structure defined in the steps described in FIG. 9.

A preferred embodiment of the hierarchical data structure 1200 is as follows:

- Element 1210 is the name by which the overall data structure is referred.
- Element 1220 is a field that contains the name of a higher level characteristic, or group, that has subordinate lower level behavioral characteristics associated with it.
- Element 1230 is a field that contains the name of a lower level behavioral characteristic subordinate to the group identified in element 1220.
- Element 1240 is a field that contains a number indicating whether this data record is describing a higher or a lower level behavior characteristic.
- Element 1250 is a field that contains the name of the hedge that will be used in the rule premise to describe the relative importance of the behavioral characteristic being described by this data record.
- Element 1260 is a field that contains the name of the hedge that will be used in the rule consequent to describe the relative importance of the behavioral characteristic being described by this data record.

In step 940, in a similar manner as in step 920 determine the relative weights of each behavior characteristic and assign linguistic variables, or hedges, to each. In a preferred embodiment, the default is to treat all characteristics as having equal weight. Some examples of linguistic variables, called hedges, included in the present invention are 'very', 'somewhat', 'extremely', 'slightly', and 'not' and describes the relative importance of a characteristic.

In step 950 store the relationships and weights between higher and lower characteristics as a hierarchy on system component 120 using the data structure shown in FIG. 12 above.

FIG. 10 is a novel structure showing an unrestricted hierarchy of higher and lower level behavior characteristics in the present invention. This extensible representation of a hierarchy of scores affords a high degree of flexibility and adaptability well suited for handling behavior profiling applications that are complex and dynamic.

For example, the behavior characteristics that indicate physician billing fraud are numerous and change frequently due to a number of unpredictable factors. A high degree of flexibility and adaptability provides the means to managing the intractable nature of this problem.

The components of the hierarchy of scores that comprise the behavior profile 1000 that are determined in FIG. 9 and are developed by the steps in FIG. 11. FIG. 12 above describes the data structure used in a preferred embodiment to represent and store the hierarchy determined in FIG. 9.

The Composite score, 1007 shown in FIG. 10, is the highest level score assigned to an entity and represents the composite effect of all lower level characteristics of the entity.

The composite score 1007 (FIG. 10) is developed in a manner similar to that described for each of the higher level characteristic scores 1017, 1027, 1037, and 1047. In this case the fuzzy reasoning process involves one or more fuzzy statements, called a composite scoring fuzzy rule, that contribute to a dynamically created and altered surface in an area known as a consequent fuzzy region (CFR).

The rule takes the form:

If E is in F then

G is in H

Where E is a higher level characteristic score 1017, 1027, 1037, or 1047 (shown in FIG. 10) as developed in 810.

Where F is a fuzzy set (FIG. 24) that measures the degree to which the higher level characteristic score 1017, 1027, 1037, or 1047 is a member of all higher level characteristic scores that are high.

Where G is the Composite Score 1007 (shown in FIG. 10) that will be developed as the result of the fuzzy reasoning process and will reflect the degree to which the entity is associated with the target behavior (i.e. cumulative association of the entity with all of the higher and lower level characteristics included in the hierarchy).

Where H is a composite scoring fuzzy set identical to fuzzy set D (1900 shown in FIG. 19) that is used in developing higher level characteristic scores 1017, 1027, 1037 and 1047 in FIG. 10, and is used to form the consequent fuzzy region (CFR).

Further: 'E is in F' is the premise expression

'G is in H' is the consequent expression.

Higher level characteristic scores 1010, 1020, 1030 and 1040 are developed and increase the information content of the behavior profile by identifying an entity's compatibility with logical sub-categories of behavior. Each higher level characteristic is comprised of an unrestricted number of lower level characteristics that are logically grouped together. The nth high level characteristic 1040 indicates that in a preferred embodiment there can be an unrestricted number of higher level characteristics.

Individual scores for each lower level behavior characteristic 1010 through 1034 in the profile are developed and contribute to the associated higher level score in accordance with the linguistic weight assigned to the characteristic.

The nth lower level characteristics 1014, 1024, 1034 and 1044 indicate that in a preferred embodiment there can be an unrestricted number of lower level characteristics logically grouped under each higher level characteristic, which are also unrestricted.

FIG. 11 is a flow chart illustrating the method for achieving four important and novel features of the invention based on the hierarchy defined in FIGS. 9 and 10. These novel features are 1) the dynamic assembly of the hierarchy from a file of records as described in FIG. 12 below, 2) the weighting of the characteristics defined in the hierarchy, 3) the scoring of the characteristics defined in the hierarchy, and 4) the expandability of the hierarchy without restriction (within the physical limitations of the computer hardware 100).

The scoring of lower level characteristics, higher level characteristics (or groups), and the composite level for each entity's behavior (as described in FIG. 10) is achieved through the novel use of a process known as fuzzy reasoning. This process is known in the prior art and is described, among other places, in U.S. Pat. Nos. 5,167,005 and 5,179,625 and is again briefly described here.

Fuzzy reasoning is used to develop one or more higher level characteristic scores (or group scores) (as shown by example in FIG. 10 boxes 1017, 1027, 1037, and 1047) that represent the degree to which an entity is associated with all of the lower level characteristics belonging to each respective group) of the hierarchy 1000. In addition, fuzzy reasoning is also used in the present invention to develop a composite score of all group scores (shown in FIG. 10 box 1007). The composite score 1007 represents the degree to which an entity is associated with all of the higher level characteristics which, in combination, represent the degree to which an entity is associated with all of the lower level characteristics in the profile hierarchy.

By "rolling up" lower level characteristic scores to higher level group scores (1010, 1020, 1030, and 1040) and further rolling up group scores into composite scores 1007, the present invention is able to process large numbers of behavior characteristics to profile the behavior of entities within a peer group.

In addition, this method allows the number of lower level and higher level characteristics to expand without restriction or alteration to the invention.

The present invention also contemplates the higher level characteristics shown in FIG. 10 as boxes 1010, 1020, 1030, and 1040, as having groupings of behavior characteristics subordinate to them in a manner similar to the way in which 1010, 1020, 1030 and 1040 are subordinate to the Composite 1005. Given this disclosure, grouping of behavioral characteristics can be used to create a plurality of levels of groups in the hierarchy.

Fuzzy reasoning is a process whereby one or more fuzzy statements (referred to in the present invention as behavior characteristic fuzzy rules) of the form If A is in B then C is in D that contribute to a dynamically created and altered surface in an area known as a consequent fuzzy region (CFR).

In this rule form

A is the behavior characteristic value (as developed in FIG. 4 box 490) for an entity.

B is the behavior characteristic fuzzy set as illustrated in FIG. 15.

C is the Score that remains under generation in the CFR until all the fuzzy rules affecting C have been evaluated. (As an example, the scores that are higher level scores made up as composites of lower level scores as shown in FIG. 10 as boxes 1017, 1027, 1037, and 1047, and the further composite of these 1005).

Where D is the scoring fuzzy set 1900 (FIG. 19) that is used to form the consequent fuzzy region (CFR).

Further 'A is in B' is the premise expression.

'C is in D' is the consequent expression.

Figure 19:
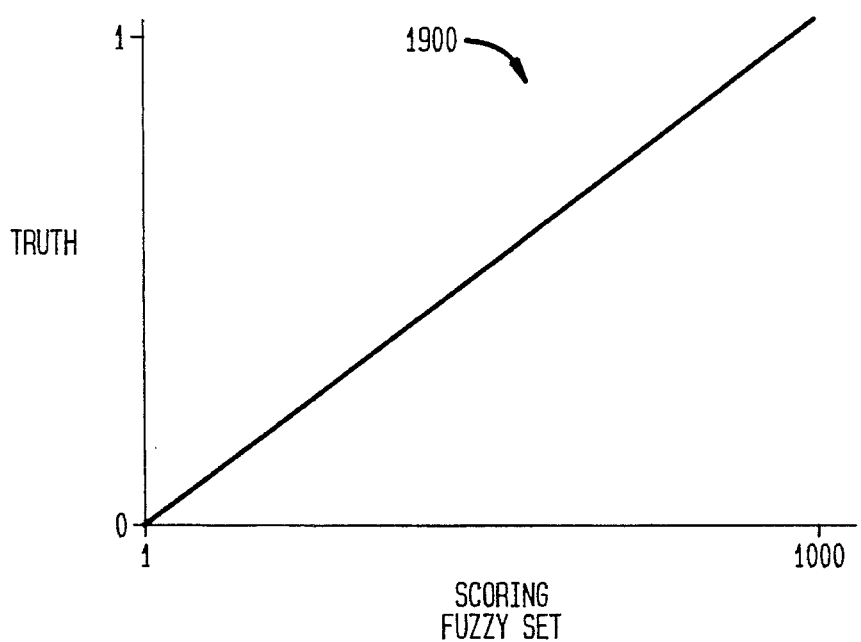
FIG. 19 is an example of a linear scoring fuzzy set.

The CFR remains under generation until all of the fuzzy statements having an affect on C have been evaluated and have contributed to the CFR. The degree and nature of the contribution of each fuzzy statement to the CFR surface is determined by the derived premise truth value for A is in B (as described in FIG. 6 and FIG. 22), and the shape of the scoring fuzzy set D (as illustrated in FIG. 19).

Figure 23:
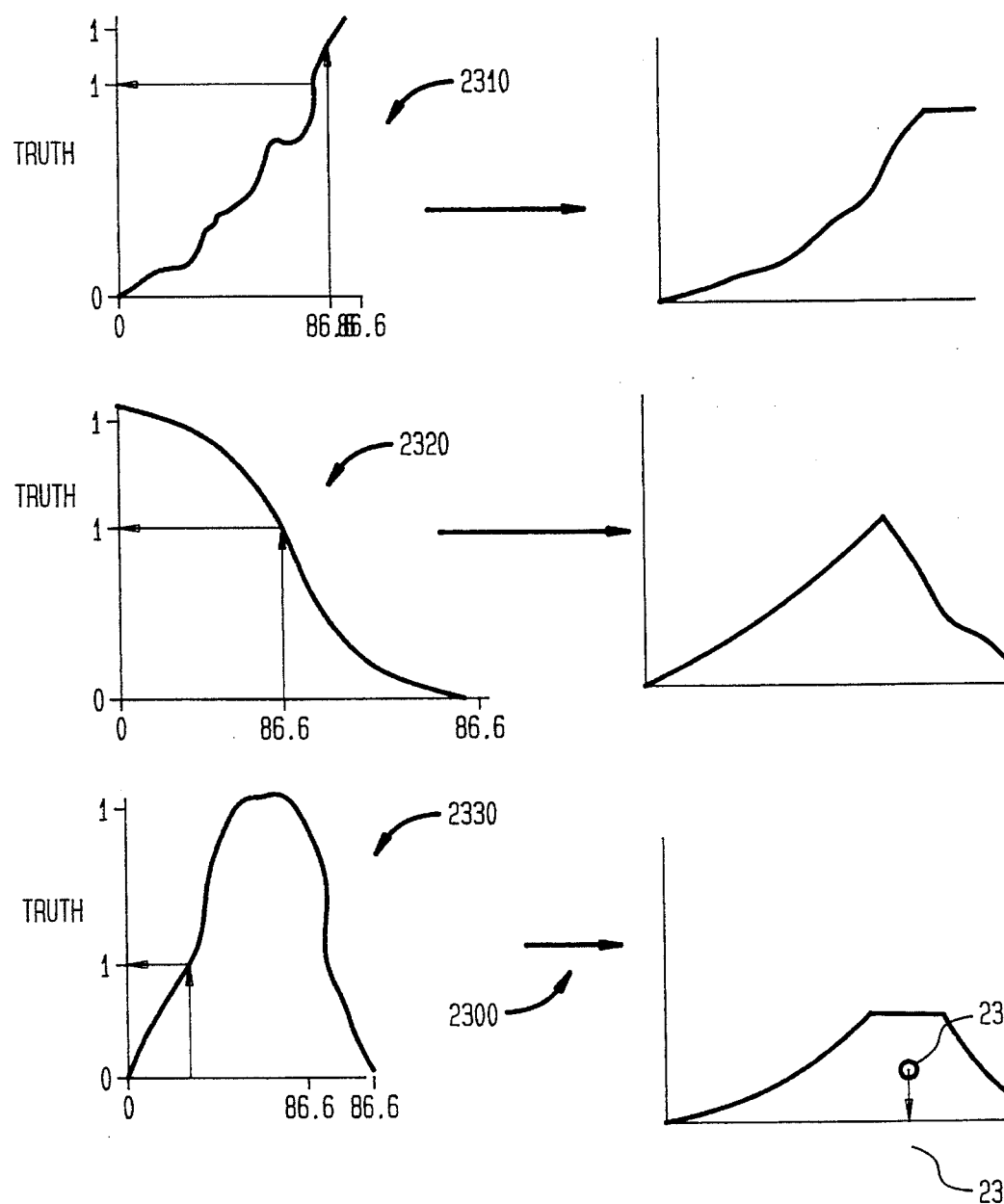
FIG. 23 illustrates the fuzzy reasoning process used to develop behavior profile scores.

FIG. 23 illustrates several incremental modifications to the CFR by applying CFR rules of modification known in the prior art as the rules of min-max described, among other places, in Zadeh's work U.S. Pat. Nos. 5,167,005 and 5,179,625.

Through a known process called defuzzification, a scalar value is extracted from the final CFR and is representative of the combined truth of all of the premise truth values of all the fuzzy statements affecting C. The defuzzified scalar value is a numeric score assigned to the profiled entity indicating the entity's compatibility with the behavioral characteristics.

There are several known methods of defuzzification including composite moments, composite maximum, nearest plateau, farthest plateau, center of gravity, and reduced entropy. These as well as other similar methods of extracting a scalar value from a surface are contemplated in the present invention. In a preferred embodiment the composite maximum method of defuzzification is used.

Figures 24, 25:
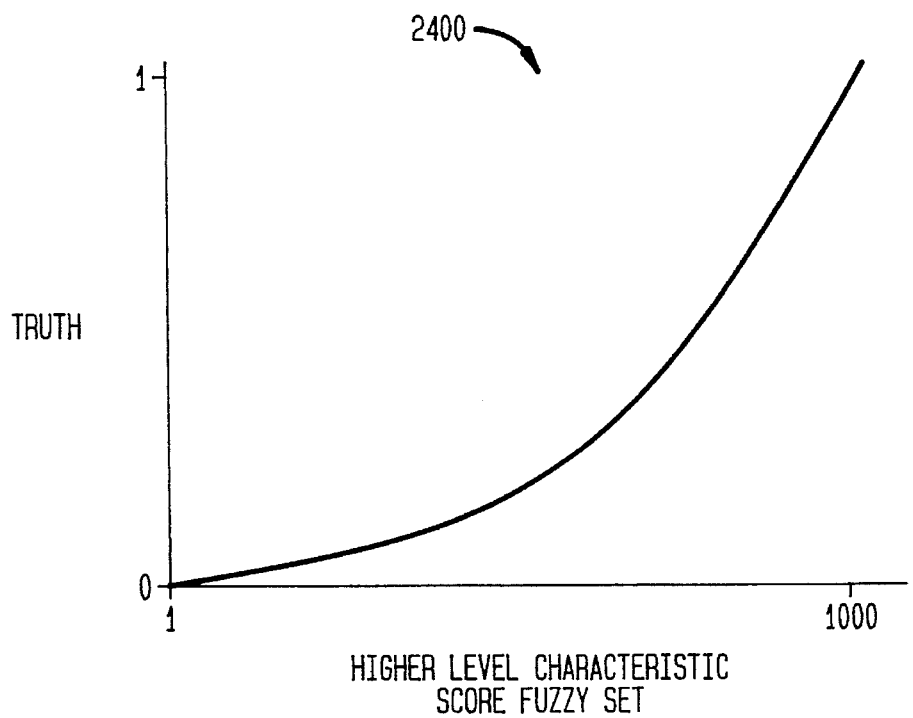
FIG. 24 is an example of a higher level characteristic scoring fuzzy set.
FIG. 25 is a data structure for storing the behavior characteristic values for each entity.

FIG. 11 performs multiple iterative fuzzy reasoning processes 2300 (FIG. 23) that are defined and controlled by information stored on a data file located on an external storage device as illustrated in FIGS. 7, 12, and 25. Each iterative fuzzy reasoning process 2300 derives a truth value for each individual behavior characteristic (as shown by 2310, 2320, 2330 in FIG. 23) that comprise the score being developed according to the hierarchy 1000. Each of the individual behavior characteristic truth values contribute to the surface of the CFR 2340 under generation. When all of the behavior characteristic truth values have been determined than the defuzzification process extracts the scalar value 2350 from the CFR 2340 using a method of defuzzification. A preferred embodiment of the invention uses the defuzzification method of composite maximum.

The fuzzy reasoning process 2300 is repeated for each higher level characteristic score defined in 1000, and a final time for the composite score 1005.

Step 1110 retrieves from data structure 1210 on system component 120 a higher level characteristic. If there are :none remaining, or if this is a one-dimensional hierarchy and there are no more lower level characteristics, than perform step 1180. If this is a one-dimensional hierarchy with lower level characteristics remaining or, if a higher level characteristic has been retrieved, begin a fuzzy reasoning process and the generation of a consequent fuzzy region and perform step 1120.

Step 1120 retrieves from data structure 1210 on system component 120 a lower level characteristic associated with the current higher level characteristic. If there are none remaining perform step 1160.

Step 1130 retrieves from data structure 710 on system component 120 the fuzzy set describing the current lower level characteristic.

Step 1140 retrieves from data structure 1210 on system component 120 the linguistic variable (hedge) describing the weight of the current lower level characteristic and modify the shape of the fuzzy set retrieved data structure 1210 on in step 1130 according to its desired affect. As an example, the hedge 'very' will reduce the membership population of the fuzzy set and intensify the affect of an entity falling within the bounds of the indicated behavior. This is shown in Figure 20.

Step 1150 retrieve from system component 120 (as examples data structures 1310 and 1410) the current entity's value for the current lower level characteristic, and the scoring fuzzy set of the higher level characteristic. Map the entity value to the current lower level characteristic fuzzy set to extract a truth value indicating the degree to which the current entity is compatible with the current lower level characteristic. This truth value and the scoring fuzzy set are used to derive the proper alteration to the consequent fuzzy region currently under generation as illustrated in FIG. 23. Perform step 1120.

Step 1160 retrieves from data structure 1210 on system component 120 the linguistic variable (hedge) describing the weight of the current higher level characteristic and use it to alter the current consequent fuzzy region under generation.

Step 1170 extracts a scalar value from the current consequent fuzzy region using one of the known methods of defuzzification. The preferred method of defuzzification in the present invention is composite maximum. The extracted scalar value is the higher level characteristic score and should be temporarily stored for use in step 1180. Perform step 1110. The general principle of fuzzy reasoning is illustrated in FIG. 23.

Step 1180 retrieves from data structure 1210 on system component 120 a higher level characteristic score and the premise and consequent composite scoring fuzzy sets. If there are no higher level characteristic scores remaining than perform step 1195. If one exists than begin a fuzzy reasoning process and the generation of a consequent fuzzy region.

Step 1190 maps the higher level characteristic score to the premise composite scoring fuzzy set to extract a truth value indicating the degree to which the current entity is compatible with a high score for the current higher level characteristic. This truth value and the consequent composite scoring fuzzy set are used to derive the proper alteration to the consequent fuzzy region currently under generation. Perform step 1180.

Step 1195 extracts a scalar value from the current consequent fuzzy region using one of the published methods of defuzzification. The preferred method of defuzzification in the current invention is composite maximum. The extracted scalar value is the composite score and should be permanently stored on system component 120. The general principle of fuzzy reasoning is illustrated in FIG. 23.

FIGS. 13 and 14 are examples of the data elements required to summarize behavior of physicians and cashiers respectively as described in step 460 above. Similar data structures can be defined for these and other entities and are contemplated by the invention.

FIG. 13 is an extract data structure for profiling physician fraud.

This data structure represents the data elements required to profile physician behavior with regard to fraudulent and abusive billing practices.

Element 1310 is the highest level of the extract data structure and is used to reference the overall data structure.

A preferred embodiment of the extract data structure is as follows:

```
01 Provider_Extract.
   03 Provider_Id              char(16),
      03 Specialty             char(05),
      03 Provider_Zip          char(9),
      03 Family_Id             char(25),
      03 Patient_Id            char(25),
      03 Patient_Age           pic'999',
      03 Patient_Zip           char(9),
      03 Visit_Date            char(10),
      03 Procedure             char(6),
      03 Procedure_Modifier    char(05),
      03 Service_Type          char(05),
      03 Quantity              pic'99999',
      03 Diagnosis_1           char(6),
      03 Diagnosis_2           char(6),
      03 Diagnosis_03          char(6),
      03 Diagnosis_4           char(6),
      03 Patient_Episode       char(10),
      03 Referring_ID          char(16),
      03 Place_Of_Service      char(03),
      03 Claim_Number          char(030),
      03 Flags,
         05 Non_Entitled       char(1),
         05 Ambulance_To_Hosp  char(1),
         05 Accident_Related   char(1),
         05 Hosp_Admis_Or_ER   char(1),
         05 OTHERS             char(16),
      03 Submit_Chg            pic'999999999999999V',
      03 Net_Payment           pic'999999999999999V',
      03 Insured_OutOfpocket   pic'999999999999999V';
```

Element 1321 uniquely identifies the provider (physician).

Element 1322 is the provider's medical specialty.

Element 1323 is the zip code of the provider's medical practice.

Element 1324 identifies the family of which the patient for the current claim is a member.

Element 1325 uniquely identifies the patient with which the current claim is associated.

Element 1326 is the age of the patient with which the current claim is associated.

Element 1327 is the zip code of the patient with which the current claim is associated.

Element 1328 is the date of the service performed on the current claim.

Element 1329 is the procedure code that identifies the procedure performed on the current claim. The health care industry standard is the CPT4 procedure code.

Element 1330 is a code indicating that the procedure code has a modifier associated with it.

Element 1331 is the type of service performed.

Element 1332 indicates the quantity of service 1329 performed.

Element 1333 indicates the first diagnosis associated with the claim. The health care industry standard is the ICD9 diagnosis codes.

Element 1334 indicates the second diagnosis associated with the claim. The health care industry standard is the ICD9 diagnosis codes.

Element 1335 indicates the third diagnosis associated with the claim. The health care industry standard is the ICD9 diagnosis codes.

Element 1336 indicates the fourth diagnosis associated with the claim. The health care industry standard is the ICD9 diagnosis codes.

Element 1337 identifies the episode of care associated with the current claim. This data element may not always be available. If it is not than any behavior characteristic requiring it must be eliminated from the profile.

Element 1338 identifies the provider that either referred the current patient to provider 1321, or the provider that performed the services in the current claim, if the provider 1321 is a clinic or group of providers.

Element 1339 identifies the location where the service was performed.

Element 1340 uniquely identifies the current claim.

Elements 1341 through 1344 are flags that indicate whether the patient is entitled to payment for the service provided under the current claim, whether the service included an ambulance trip to the hospital, whether the service provided was caused by an accident, and whether the service included either a hospital visit or an emergency room visit.

Element 1345 is the amount charged by provider 1321.

Element 1346 is the amount paid to provider 1321.

Element 1347 is the amount of out of pocket expense incurred by the patient.

FIG. 14 is an extract data structure for profiling cashier fraud.

This data structure represents the data elements required to profile cashier behavior with regard to employee dishonesty and fraud.

Element 1410 is the highest level of the extract data structure and is used to reference the overall data structure.

A preferred embodiment of the extract data structure is as follows:

```
01 Cashier_Extract.
   03 Cashier_Id                      char(16),
   03 Store_Id                        char(16),
   03 Cashier_Type                    char(2),
   03 Manufactuer_Coupon_Y/N            char(1),
   03 Store_Coupon_Y/N                  char(1),
   03 Manufacturer_Coupon_Value       pic 9(5)v99,
   03 Store_Coupon_Value              pic 9(5)v99,
   03 Price_Verify_Y/N                  char(1),
   03 SS_Value_For_Item               pic 9(5)v99,
   03 Empoyee_Discount_Y/N              char(1),
   03 Professional_Discount_Y/N         char(1),
   03 Senior_Discount_Y/N               char(1),
   03 Refund_Y/N                        char(1),
   03 Last_Item_Void_Y/N                char(1),
   03 Previous_Item_Void_Y/N            char(1),
   03 Last_Item_Void_Value            pic 9(5)v99,
   03 Previous_Item_Void_Value        pic 9(5)v99,
   03 No_Sale_Trans_Y/N                 char(1),
   03 Scanned_Item_Y/N                  char(1),
   03 Payout_Y/N                        char(1),
   03 Payout_Value                    pic 9(5)v99;
```

Element 1421 uniquely identifies the cashier.

Element 1422 uniquely identifies the store in which the cashier is located.

Element 1423 identifies the type of cashier.

Element 1424 indicates that the current transaction includes a manufacturer's coupon.

Element 1425 indicates that the current transaction includes a store coupon.

Element 1426 indicates the amount of a manufacturer's coupon.

Element 1427 indicates the amount of a store coupon.

Element 1428 indicates that the current transaction is a price verify.

Element 1429 indicates the amount of the current item purchased.

Element 1430 indicates that the current transaction is an employee discount.

Element 1431 indicates that the current transaction is a professional discount.

Element 1432 indicates that the current transaction is a senior citizen discount.

Element 1433 indicates that the current transaction is a refund.

Element 1434 indicates that the last item was voided.

Element 1435 indicates that the previous to last item was voided.

Element 1436 indicates the amount of a last item void.

Element 1437 indicates the amount of a previous item void.

Element 1438 indicates that the current transaction is a No Sale.

Element 1439 indicates that the current transaction was processed with a scanning device.

Element 1440 indicates that the current transaction resulted in a payout (negative cash).

Element 1441 indicates the amount of a payout transaction.

FIG. 25 is a data structure for storing the behavior characteristic values for each entity.

This data structure is used in FIG. 11 to develop scores from the behavior characteristic values for each entity.

Element 2510 is the highest level of the data structure and is used to reference the overall data structure.

A preferred embodiment of the extract data structure is as follows:

```
01 Behavior_Characteristic,
   03 BC_Entity           char(16),
   03 BC_Id               char(8),
   03 BC_Value            pic 9(8)v9(4).
```

Element 2510 is used to reference the overall data structure.

Element 2520 is the unique identifier of the entity being profiled and to which this data record applies.

Element 2530 is the unique identifier for the behavior characteristic to which this data record applies.

Element 2540 is the value for the behavior characteristic indicated by 2530 determined in FIG. 4 box 490 which is mapped into its corresponding behavior characteristic fuzzy set determined in FIG. 6.

Figure 26:
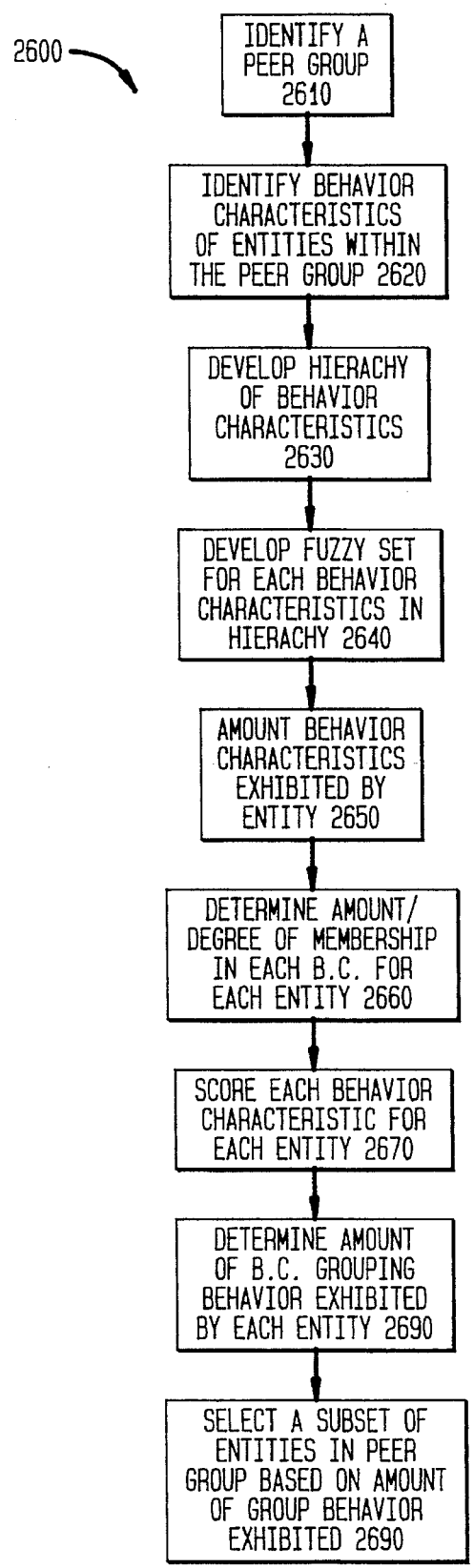
FIG. 26 is a flow chart showing a method of using the present invention.

FIG. 26 is a flow chart of the steps in the using the present system 100 and method 200. The method 2600 comprises the following steps:

Step 2610 is the identification of the subject peer group to be profiled in a manner similar to that done in step 210 in FIG. 2.

Step 2620 is determining the behavior characteristics, i.e., the behavior characteristic set, that will be the object of the behavior profile for the entities in the peer group identified in step 2610. See steps 220 and 230.

Step 2630 is developing the hierarchy of behavior characteristics as described in step 260 of FIG. 2.

Step 2640 is developing fuzzy sets for each behavior characteristic in the hierarchy as in step 240 of FIG. 2.

Step 2650 is determining the amount of behavior characteristic exhibited by the entity as described in step 490 of FIG. 4.

Step 2660 is determining the degree of membership of an entity has in each behavior characteristic by mapping the entity behavior characteristic values to the corresponding behavior characteristic fuzzy sets, a process described in step 1150 in FIG. 11.

Step 2670 scores each behavior characteristic for each entity as described in step 1150 in FIG. 11.

Step 2680 is determining the amount of behavior characteristic groupings exhibited by each entity as described in step 1170 and 1195 in FIG. 11.

Step 2690 is selecting a subset of entities in the peer group based on the amount of the target behavior exhibited. This process involves an evaluation of what amount of target behavior is actionable in a way contemplated by the process described in step 410 in FIG. 4. One one to facilitate this selection is to provide the user a list of entities ranked by the profile of the amount of target behavior exhibited.

As an example, when searching for fraudulent physicians, a fraud investigator must make a determination as to whether the amount of fraudulent behavior indicated by step 1195 in FIG. 11 is sufficient to warrant further investigation or if the suspect should be ignored. This determination is made by reviewing the amount of each individual behavior characteristic and each group of behavior characteristics belonging to each suspect physician.

A novel use of method 200 is made by repeatedly profiling behavior as described in steps 2610 through 2690 and storing the results of behavior profile scores over long periods of time to establish a behavior trend for each entity in the target peer group. As in the case of physician fraud, criminally prosecurable behavior is the result of gradually declining behavioral practices over long periods of time that can only be detected by charting behavior measured in this way.

Another important and novel use of the method 200 is to utilize an analysis tool such as the one described in U.S. Patent application Ser. No. 07/854,921 to Rabenhorst filed on Mar. 20, 1992 referenced in FIG. 4, to perform post-modeling analysis to determine the relevance of behavior characteristics and the inter-relationships between behavioral characteristics. Behavior characteristics that are determined, through the use of such a tool, to be more or less important to the identification of entities belonging to a particular behavior can be then weighted accordingly as in step 920 in FIG. 9. As an example, behavioral characteristics that are highly correlated to entities with high composite scores (1007 shown on FIG. 10) can be assigned the hedge VERY, indicating a high importance relative to other behavioral characteristics.

Conversely, such a tool can be used to assess the degree to which previously identified behavior characteristics are not contributing to the identification of entities associated with the target behavior so those behavior characteristics can be removed from the hierarchy.

Finally, a post-modeling tool such as this can be used to identify new behavioral characteristics not previously known to the domain expert. This can be done by determining the correlation of data elements in data structures such as those defined in FIGS. 13 and 14 with entities having high composite scores (1007 in FIG. 10) as determined in step 1195 in FIG 11.

I claim:

1. A method of profiling behavior of an entity comprising the steps of:
   a. identifying a peer group having a plurality of entities, each entity exhibiting one or more behavioral characteristics;
   b. determining a behavioral characteristic set of two or more of the behavioral characteristics that contribute to an entity profile that indicates a target behavior;
   c. determining an amount of behavior characteristic each entity exhibits for each behavior characteristic in the behavior characteristic set;
   d. defining a behavior characteristic fuzzy set for each behavior characteristic in the behavior characteristic set, each behavior characteristic fuzzy set defined using statistics of the respective amount of behavior characteristic exhibited by the entities in the peer group and each behavior characteristic fuzzy set being a function that represents an amount of membership one or more individual entities has in the respective behavior characteristic for an amount of behavior characteristic the individual entity exhibits;
   e. using the behavior characteristic fuzzy sets to determine the amount of membership the individual entity has in each respective behavior characteristic in the behavior characteristic set;
   f. scoring the amount of membership of each behavior characteristic for the individual entity to determine a score of each of the behavior characteristics in the behavior characteristic set for the individual entity, the score determined from a scoring fuzzy set having a scoring surface that maps the amount of membership of the behavior characteristic to the score; and
   g. combining the the scores of each of the behavior characteristics in the behavior characteristic set for the individual entity to develop a composite used as an entity profile, the composite representing the degree of membership that the individual entity has in the target behavior.

2. A method, as in claim 1, where the composite is developed using fuzzy reasoning and defuzzification.

3. A method of profiling behavior of an entity comprising the steps of:
   a. identifying a peer group having a plurality of entities, each entity exhibiting one or more behavioral characteristics;
   b. determining a behavioral characteristic set of one or more of the behavioral characteristics that contribute to an entity profile that indicates a target behavior;
   c. grouping the behavioral characteristics in the behavioral characteristic set into a hierarchy of one or more high level characteristics and one or more lower level characteristics, a lower level characteristic set being logically associated with a higher level characteristic and determining how much the associated higher level characteristic contributes to the profile;
   d. determining the amount of each behavioral characteristic each entity exhibits for the behavioral characteristics in one or more lower level behavior characteristics;
   e. defining a behavior characteristic fuzzy set for each behavior characteristic in the lower level characteristic sets that represents the amount of membership an entity has in the respective behavioral characteristic, each behavior characteristic fuzzy set defined using statistics of the respective amount of behavior characteristic exhibited by the entities in the peer group and each behavior characteristic fuzzy set being a function that represents an amount of membership that one or more individual entities has in the respective behavior characteristic for an amount of behavior characteristic the individual entity exhibits;
   f. using the behavior characteristic fuzzy sets to determine the amount of membership the individual entity has in each respective behavior characteristic in the lower level characteristic set;
   g. using a scoring fuzzy set to determine a score that an entity has for each respective behavior characteristic in the lower level characteristic set based on the respective amount of membership of the entity has in the behavior characteristic, the scoring fuzzy set having a scoring surface that maps the amount of membership of the behavior characteristic to the score;
   h. developing, from the scores of the lower level characteristics in the hierarchy, a group score for each associated high level characteristic; and
   i. establishing a profile of an entity's behavior using a composite score of the group scores in the hierarchy by using fuzzy reasoning and defuzzification.

4. A method, as in claim 3, where the score of one or more behavior characteristics of an entity is weighted.

5. A method, as in claim 4, where the weighting is done by hedging the scoring fuzzy set.

6. A method, as in claim 5, where the hedging is linguistic hedging.

7. A method, as in claim 3, where the hierarchy is expandable.

8. A method, as in claim 7, where the hierarchy is expandable by adding records that contain information defining a lower level behavior characteristic and the group to which the lower level behavior characteristic belongs.

9. A method, as in claim 3, where the fuzzy set has any one of the types of fuzzy set surfaces including linear, inclining growth, declining growth, bell, and inverted bell.

10. A method, as in claim 9, where the type of fuzzy set is user selected.

11. A method, as in claim 3, where the fuzzy set is defined by a set of truth pairs.

12. A method, as in claim 5, where the hedging is any one of the hedge types including VERY, SOMEWHAT, EXTREMELY, SLIGHTLY, and NOT.

13. A method, as in claim 12, where the hedge type is user selected.

14. A method, as in claim 3, where the composite score of the group scores is determined using hedged group score fuzzy sets.

15. A method, as in claim 3, where the hierarchy has a plurality of levels.

16. A system for profiling the target behavior of one or more entities comprising:
   a. a computer having a central processing unit, a memory, and a user interface;
   b. a plurality of entity data structures, stored in memory, each defining an entity in a plurality of entities in a peer group;
   c. a plurality of fuzzy set data structures, stored in memory, each defining a degree of entity membership in a behavior characteristic for a given amount of the behavior characteristic that the entity exhibits, the behavior characteristic being one of a plurality of behavior characteristics contributing to the profile of the target behavior of the entity;
   d. a plurality of hierarchy data structures, stored in memory, each defining a group of behavior characteristics to which the behavior characteristic belongs in a hierarchy of behavior characteristics;
   e. a plurality of behavior characteristic amount data structures, stored in memory, each defining the amount of a behavior characteristic exhibited by an entity;
   f. an algorithm, executed by the central processing unit to perform the following steps:
      1. using the hierarchy data structures to group the behavioral characteristics into a hierarchy of one or more high level characteristics and one or more lower level characteristics, a lower level characteristic set being logically associated with a higher level characteristic and determining how much the associated higher level characteristic contributes to the profile;
      2. using the amount data structures to determine the amount of each behavior characteristic each entity exhibits for the behavior characteristics in one or more lower level behavior characteristics, the entities determined from the entity data structures;
      3. using the fuzzy set data structures to define a fuzzy set for each behavior characteristic in the lower level behavior characteristic sets that represents the amount of membership an entity has in the respective behavior characteristic;
      4. using the fuzzy sets to determine the amount of membership one or more entities has in each respective behavior characteristic in the lower level characteristic set;
      5. using a scoring fuzzy set to determine a score that an entity has for each respective behavior characteristic in the lower level characteristic set based on the respective amount of membership of the entity has in the behavior characteristic;
      6. developing, from the scores of the lower level characteristics in the hierarchy, a group score for each associated high level characteristic; and
      7. establishing a profile of an entity's target behavior with a composite score of the group scores in the hierarchy determined by using fuzzy reasoning and defuzzification.

17. A system, as in claim 16, where one or more entity profiles is displayed to the user on the user interface.

18. A system, as in claim 17, where the user interface is a graphical display.

19. A system, as in claim 17, where the user interface is a printer.

20. A system, as in claim 17, where one or more entity profiles are displayed to the user in an order ranked by degree of target behavior.

21. A system, as in claim 16, where the profiled entities are physicians and the behavior characteristics are physician behavior.

22. A system, as in claim 21, where the physician behavior indicates fraud.

23. A system, as in claim 16, where the profiled entities are employees and the behavior characteristics are employee behavior.

24. A system, as in claim 23, where the employees are cashiers and the behavior characteristics indicate fraud.

25. A system, as in claim 23, where the employees are purchasing agents and the behavior characteristics indicate purchasing transactions.

26. A system, as in claim 23, where the employees are sales people and the behavior characteristics indicate sales activity.

27. A system, as in claim 16, where the profiled entities are business units and the behavior characteristics indicate performance.

28. A system, as in claim 27, where the business units can be any one of the set of: departments in a corporation, clinics, hospitals, medical supply companies, ambulance service companies, laboratories, nursing homes, and pharmacies.

29. A system, as in claim 16, where the profiled entities are securities and the behavior characteristics indicate security portfolio performance.

30. A method of using an entity behavior profiler comprising the steps of:
   a. identifying a peer group having a plurality of entities, each entity exhibiting one or more behavioral characteristics;
   b. determining a behavioral characteristic set of one or more behavioral characteristics that contribute to an entity profile that indicates a target behavior;
   c. grouping the behavioral characteristics in the behavioral characteristic set into a hierarchy of one or more high level characteristics and one or more lower level characteristics, a lower level characteristic set being logically associated with a higher level characteristic and determining how much the associated higher level characteristic contributes to the profile;

d. determining the amount of each behavior characteristic each entity exhibits for the behavior characteristics in one or more lower level behavior characteristics;

e. defining a behavior characteristic fuzzy set for each behavior characteristic in the lower level behavior characteristic sets that represents the amount of membership an entity has in the respective behavior characteristic, each behavior characteristic fuzzy set defined using statistics of the respective amount of behavior characteristic exhibited by the entities in the peer group and each behavior characteristic fuzzy set being a function that represents an amount of membership that one or more individual entities has in the respective behavior characteristic for an amount of behavior characteristic the individual entity exhibits;

f. using the behavior characteristic fuzzy sets to determine the amount of membership the individual entity has in each respective behavior characteristic in the lower level characteristic set;

g. using a scoring fuzzy set to determine a score that an entity has for each respective behavior characteristic in the lower level characteristic set based on the respective amount of membership of the entity has in the behavior characteristic, the scoring fuzzy set having a scoring surface that maps the amount of membership of the behavior characteristic to the score;

h. developing, from the scores of the lower level characteristics in the hierarchy, a group score for each associated high level characteristic;

i. establishing a profile of an entity's behavior using a composite score of the group scores in the hierarchy by using fuzzy reasoning and defuzzification; and j. selecting a subset of entities in the peer group that exhibit a level of target behavior indicated by the profile.

31. A method, as in claim 30, where the profile of one or more entities is trended over time.

32. A method, as in claim 30, where the profiles of a plurality of entities is ranked in a list.

* * * * *